United States Patent [19]
Bennett et al.

[11] Patent Number: 5,920,882
[45] Date of Patent: Jul. 6, 1999

[54] PROGRAMMABLE CIRCUIT ASSEMBLY AND METHODS FOR HIGH BANDWIDTH DATA PROCESSING

[75] Inventors: Toby D. Bennett, Hyattsville; James W. Bishop, Glendale; Donald J. Davis, Severn; Jonathan C. Harris, Crofton, all of Md.

[73] Assignee: TSI TelSys Inc., Columbia, Md.

[21] Appl. No.: 08/752,940

[22] Filed: Nov. 21, 1996

[51] Int. Cl.$^6$ ..................................................... G06F 13/00
[52] U.S. Cl. ...................... 711/101; 326/39; 340/825.83; 365/63; 365/189.08
[58] Field of Search ..................................... 711/100, 103, 711/104, 105, 109, 101; 326/39, 41; 340/825.83; 365/51, 63, 189.08

[56] References Cited

U.S. PATENT DOCUMENTS

| | | | |
|---|---|---|---|
| 5,109,353 | 4/1992 | Sample et al. | 364/578 |
| 5,497,498 | 3/1996 | Taylor | 395/284 |
| 5,537,607 | 7/1996 | Pluger, III | 395/830 |
| 5,559,450 | 9/1996 | Ngai et al. | 326/40 |
| 5,572,148 | 11/1996 | Lytle et al. | 326/41 |
| 5,633,830 | 5/1997 | Sung et al. | 365/221 |

OTHER PUBLICATIONS

B. Fross, "The WILDFIRE FPGA–Based Custom Computing Machine," Annapolis Micro Systems, Inc., Annapolis, MD., 7 pages, date unknown.

S. Casselman, M. Thornburg, and J. Schewel, "Creation of Hardware Objects in a Reconfigurable Computer," Virtual Computer Corporation, Reseda, Ca., 10 pages, date unknown.

S. Casselman, "Virtual Computing and the Virtual Computer," Presented at IEEE Workshop on FPGAs for Custom Computing Machines, Reseda, California, 1993, 5 pages.

B. Fross, R. Donaldson, and D. Palmer, "PCI–based WILD-FIRE reconfigurable computing engines," Annapolis Micro Systems, Inc., Annapolis MD., 10 pages, date unknown.

B. Taylor and B. Varga, "Segmented Busses Deliver 15x Memory Bandwidth Increase for Image and Signal Processing in a Virtual Hardware Environment," Giga Operations Corporation, Berkeley, CA., 8 pages, date unknown.

M. Gokhale et al., "SPLASH: A Reconfigurable Linear Logic Array," Supercomputing Research Center, Bowie MD, Jan. 1994, pp. 1–16.

*Primary Examiner*—Glenn Gossage
*Attorney, Agent, or Firm*—Jerome D. Jackson

[57] ABSTRACT

A programmable circuit assembly and methods for high bandwidth data processing. The assembly includes an array of in-circuit programmable logic packages interconnected with an array of memory packages, allowing for elastic buffering of data in a variety of directions. Each programmable package includes package leads, a memory, and output drivers. Each output driver is connected to a respective package lead, which is configured to generate a logic function defined by programming data stored in the memory. A method includes storing programming data for operating the assembly to send signals on different paths between a programmable package and a memory package.

18 Claims, 19 Drawing Sheets

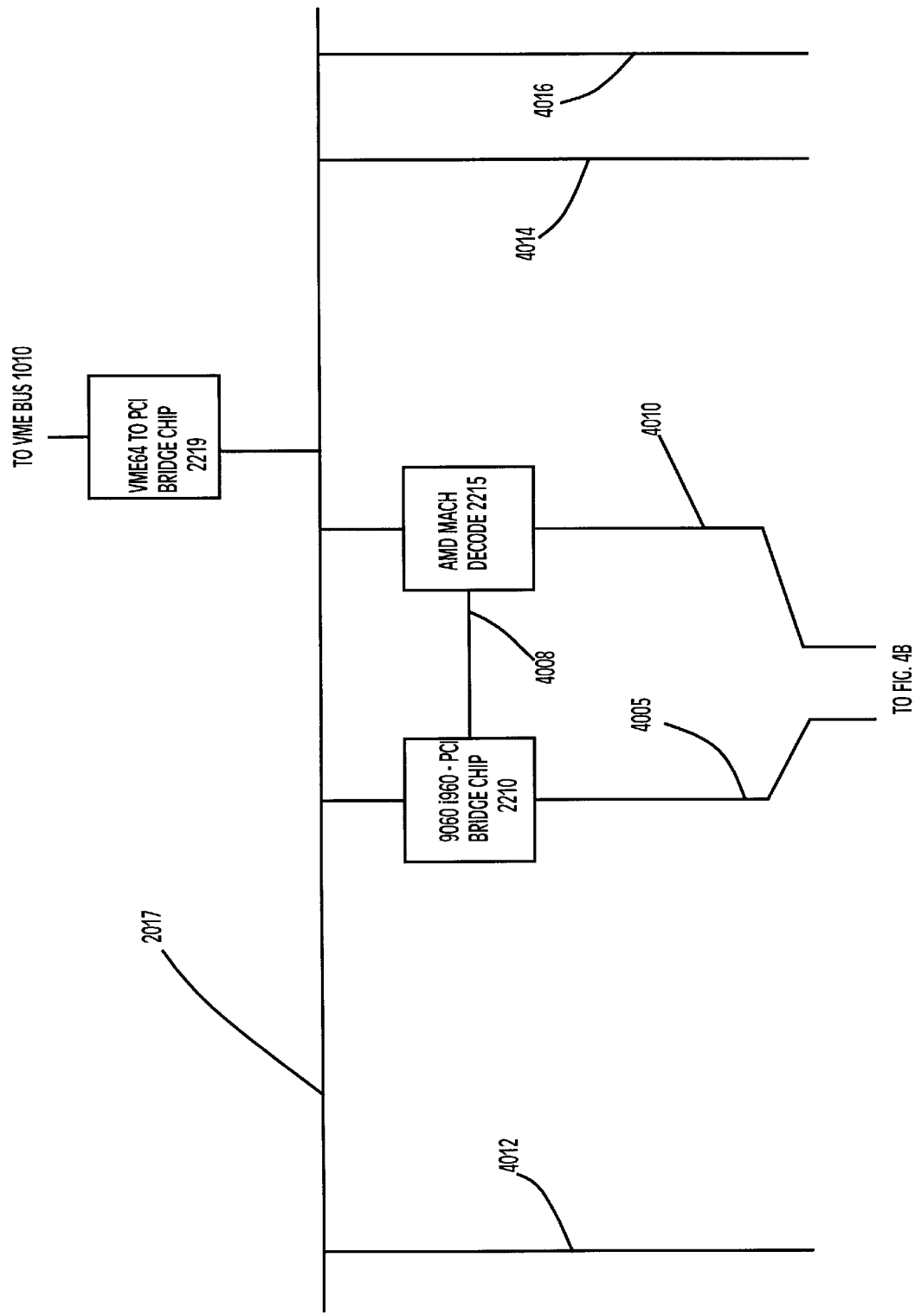

PROGRAMMABLE CIRCUIT ASSEMBLY AND METHODS FOR HIGH BANDWIDTH DATA PROCESSING

BACKGROUND OF THE INVENTION

1. Field of the Invention

This invention relates generally to data processing and, more particularly, to a programmable circuit assembly for high bandwidth data processing.

2. Description of Related Art

Programmable hardware processors can be made to perform various functions by writing data into a program memory. One example of a programmable processor is a microprocessor. A microprocessor sequentially fetches instructions from a program memory and performs the functions dictated by the instructions. Another type of programmable processor is a field programmable gate array such as the XILINX 5215, available from Xilinx, Inc. The XILINX 5215 performs logic and routing functions depending on the contents of an internal, integrated program memory.

Programmable processors have the advantage of flexibility. Dedicated, non-programmable, hardware is often required, however, to achieve the highest processing speeds. Thus, in applications such as satellite telemetry, it has been difficult to take advantage of the flexibility of programmable processors. In other words, some high speed applications have required large amounts of dedicated, non-programmable, hardware that is expensive to develop and manufacture.

SUMMARY OF THE INVENTION

It is an object of the present invention to provide a programmable circuit assembly for high bandwidth data processing.

To achieve this and other objects of the present invention, there is a method of operating a system having a programmable circuit assembly comprising a substrate, a programmable package with a plurality of interface contacts including a first interface contact, a memory, and a plurality of output circuits, each output circuit connected to a respective interface contact, each output circuit configured to generate a logic function defined by a contents of the memory, a memory package having a first-in-first-out (FIFO) memory, a first interface contact for writing into the FIFO, and a second interface contact for reading from the FIFO, a first signal path connected between the programmable package and the first interface contact on the memory package, and a second signal path connected between the programmable package and the second interface contact on the memory package. The method of operating the system comprises the steps of storing a programming signal for operating the assembly to send a first signal from the second signal path, through the programmable package, to the first interface contact of the programmable package; and storing another programming signal for operating the assembly to send a second signal from the first interface contact of the programmable package, through the programmable package, to the first signal path.

According to another aspect of the present invention, there is a method of operating a system having a plurality of programmable circuit assemblies, each assembly including a substrate, a programmable package with a plurality of interface contacts including a first interface contact, a memory, and a plurality of output circuits, each output circuit connected to a respective interface contact, each output circuit configured to generate a logic function defined by a contents of the memory, a memory package having a first-in-first-out (FIFO) memory, a first interface contact for writing into the FIFO, and a second interface contact for reading from the FIFO, a first signal path connected between the programmable package and the first interface contact on the memory package, and a second signal path connected between the programmable package and the second interface contact on the memory package, the plurality of programmable assemblies having a common spatial location of the memory package on the substrate, and a common spatial location of the programmable package on the substrate. The method of operating the system comprises the steps of operating a first one of the assemblies to send a first signal from the second signal path, through the programmable package, to the first interface contact of the programmable package; and operating a second one of the assemblies to send a second signal from the first interface contact of the programmable package, through the programmable package, to the first signal path.

According to yet another aspect of the present invention, a system comprises a substrate; a programmable package with a plurality of interface contacts including a first interface contact, a memory, and a plurality of output circuits. Each output circuit is connected to a respective interface contact, each output circuit configured to generate a logic function defined by a contents of the memory; a memory package having a first-in-first-out (FIFO) memory. The system also comprises a first interface contact for writing into the FIFO, and a second interface contact for reading from the FIFO; a first signal path connected between the programmable package and the first interface contact on the memory package; a second signal path connected between the programmable package and the second interface contact on the memory package; and a memory including a first programming signal for operating the assembly to send a first signal from the second signal path, through the programmable package, to the first interface contact of the programmable package, and a second programming signal for operating the assembly to send a second signal from the first interface contact of the programmable package, through the programmable package, to the first signal path.

According to yet another aspect of the present invention, a system comprises a plurality of programmable circuit assemblies. Each assembly includes a substrate, a programmable package with a plurality of interface contacts including a first interface contact, a memory, and a plurality of output circuits. Each output circuit is connected to a respective interface contact. Each output circuit is configured to generate a logic function defined by a contents of the memory. Each assembly also includes memory package having a first-in-first-out (FIFO) memory, a first interface contact for writing into the FIFO, and a second interface contact for reading from the FIFO, a first signal path connected between the programmable package and the first interface contact on the memory package, and a second signal path connected between the programmable package and the second interface contact on the memory package. The plurality of programmable assemblies have a common spatial location of the memory package on the substrate, and a common spatial location of the programmable package on the substrate. The system also comprises means for operating a first one of the assemblies to send a first signal from the second signal path of the first assembly, through the programmable package of the first assembly, to the first interface contact of the programmable package of the first assembly; and means for operating a second one of the assemblies to send a second signal from the first interface contact of the programmable package of the second assembly, through the programmable package of the second assembly, to the first signal path of the second assembly.

According to yet another aspect of the present invention, a programmable circuit assembly comprises a substrate; a package group connected to the substrate, including a first package group and a second package group. Each plurality of package groups includes a programmable package with a plurality of interface contacts, a memory, and a plurality of programmable input/output (I/O) circuits. Each I/O circuit connected to a respective interface contact, each I/O circuit configured to generate a logic function defined by a contents of the memory; a memory package having a first-in-first-out (FIFO) memory. The assembly also comprises a first plurality of interface contacts for writing into the FIFO, circuitry for sending signals on each of the first plurality of interface contacts into a memory location of the FIFO, a second plurality of interface contacts for reading from the FIFO, and other circuitry for sending signals from a memory location of the FIFO to the second plurality of interface contacts. The assembly also comprises a first plurality of signal paths each having a first end connected to a respective interface contact on the programmable package and a second end connected to a respective one of the first plurality of interface contacts on the memory package, each first signal path configured such that a voltage on the corresponding first interface contact is a delayed function of the voltage on the corresponding interface contact of the programmable package. The assembly also comprises and a second plurality of signal paths each having a first end connected to a respective one of the second plurality of interface contacts on the memory package and a second end connected to a respective interface contact on the programmable package, each second signal path configured such that a voltage on the corresponding interface contact of the programmable package is a delayed function of the voltage on the corresponding second interface contact a random access memory (RAM) package having a RAM and first and second access ports, each access port having a plurality of interface contacts for writing into the RAM, and circuitry for sending signals on each of the plurality of interface contacts into a memory location of the RAM; a third plurality of signal paths each having a first end connected to a respective interface contact on the programmable package in the first package group, and a second end connected to a respective one of the plurality of interface contacts of the first access port; and a fourth plurality of signal paths each having a first end connected to a respective interface contact on the programmable package in the second package group, and a second end connected to a respective one of the plurality of interface contacts of the second access port.

BRIEF DESCRIPTION OF THE DRAWINGS

FIGS. 4A and 4B are a block diagram showing circuitry common to each programmable assembly in the digital processing kiosk.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

First Preferred Embodiment

Figure 1:
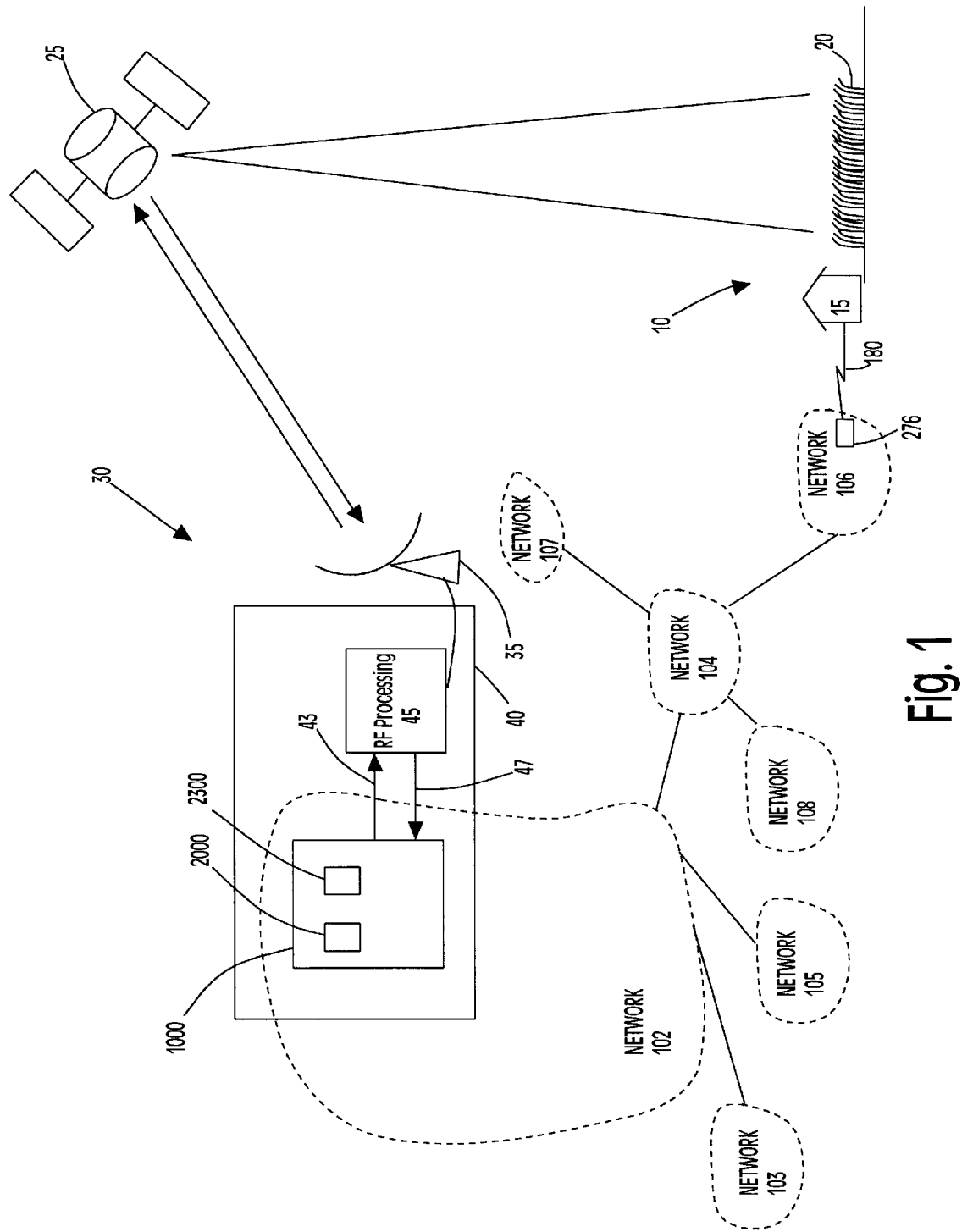
FIG. 1 is a diagram of a system for processing satellite telemetry data according to a first preferred embodiment of the present invention.

FIG. 1 shows a system for processing satellite telemetry data according to a first preferred embodiment of the present invention. The first preferred system allows a farmer in farm house 15 to receive and display satellite images of his fields 20 using a personal computer in farm house 15. These images may emphasize certain optical wave lengths, allowing the farmer to examine the condition of various areas of his farm. This ability allows the farmer to farm more precisely by, for example, only applying pesticides to those areas of his farm that are insect-plagued.

More specifically, farm 10 is a small to medium sized farm including farm house 15 and fields 20 supporting various crops. Satellite 25 is in low earth orbit photographing the land under its path including, at certain times, fields 20. Satellite 25 transmits a radio signal, encoding the electronic image of fields 20, to ground station 30.

Ground station 30 includes satellite antenna 35 and equipment house 40. Equipment house 40 includes radio frequency (RF) processing circuitry 45 that demodulates a signal from antenna 35 and sends a corresponding serial digital signal to digital processing kiosk 1000, via signal cable 47. Kiosk 1000 includes a backplane and a programmable circuit assemblies 2000 and 2300 each plugged into the backplane.

Kiosk 1000 constitutes a node on computer network 102. Computer 276 constitutes a node on computer network 106. Computer networks 102, 106, 104, 107, 103, 105, and 108 are interconnected, thereby constituting a network of computer networks, commonly known as the Internet. A personal computer in farm house 15 receives satellite image data of fields 20 via telephone line 180 and the Internet.

Kiosk 1000 also includes circuitry for receiving data from network 102 and sending a corresponding serial digital signal to RF processing circuitry 45 via signal cable 43. RF processing circuitry 45 modulates the signal from cable 43 and sends the modulated signal to antenna 35, which transmits the modulated signal to satellite 25.

Figure 2:
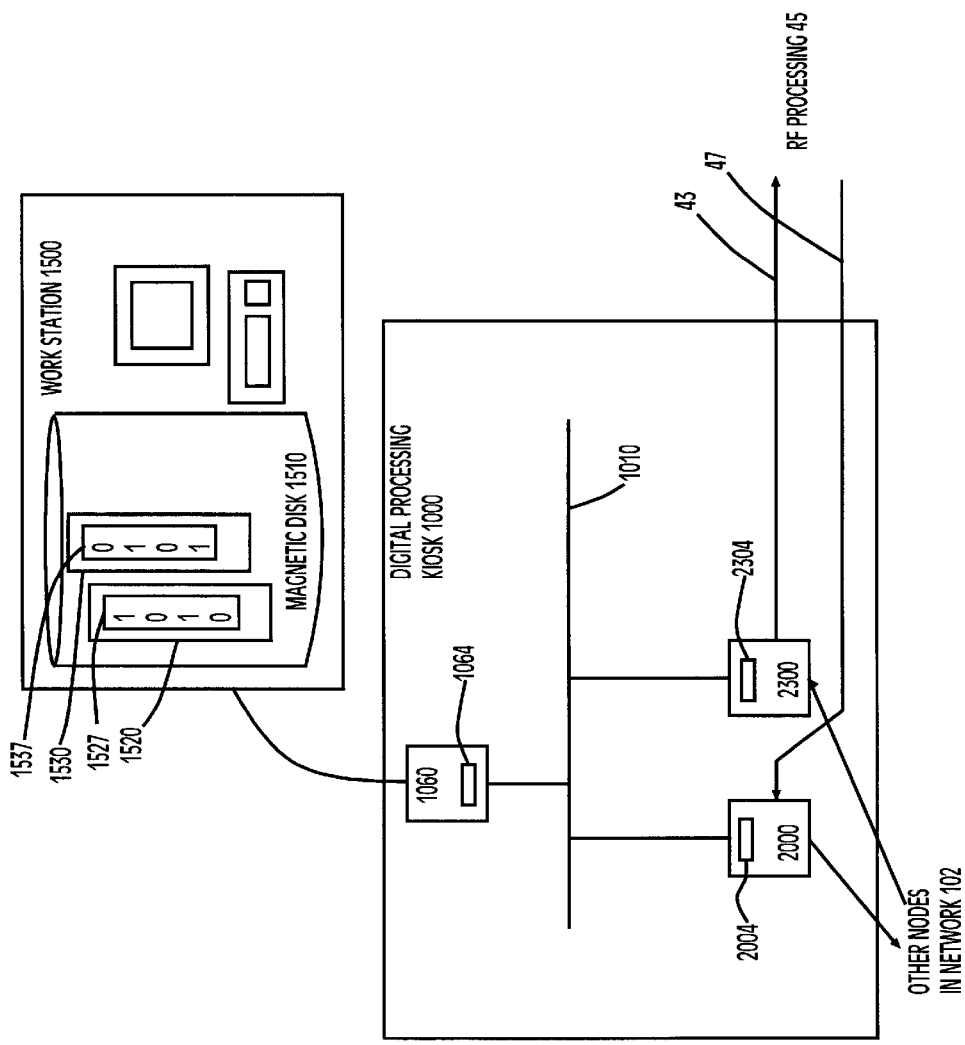
FIG. 2 is another diagram showing the digital processing kiosk of FIG. 1 in more detail.

FIG. 2 shows digital processing kiosk 1000 including programmable circuit assembly 2000, and programmable circuit assembly 2300. Assembly 2000, assembly 2300, and controller board 1060 are each connected to VME bus 1010. Controller board 1060 contains a computer. Assembly 2000 includes a frame synchronizer for recognizing frames of telemetry data on cable 47. Assembly 2000 also includes an ATM interface for sending packets of telemetry data onto network 102. This telemetry data eventually reaches computer 276, which is in a business that provides satellite image data to farmers on a subscription basis.

Assembly 2300 includes an ATM interface for receiving packets of data from network 102. Assembly 2300 also includes serial output circuitry for constructing frames of satellite command data and sending a corresponding serial output signal to RF processing circuitry 45 via cable 43.

Work station 1500 executes software to schedule data acquisition and to otherwise monitor and control the circuitry within kiosk 1000.

Work station 1500 and controller board 1060 effect the initialization of programmable gate arrays on assemblies 2000 and 2300. More specifically, workstation 1500 includes magnetic disk 1510 for storing initialization files 1520 and 1530. Each of files 1520 and 1530 includes 6 records, each record for initializing a respective programmable gate array. When kiosk 1000 powers up, workstation 1510 sends the contents of file 1520 to programmable assembly 2000, via controller board 1060 and VME bus 1010; and sends the contents of file 1530 to assembly 2300 via controller 1060 and VME bus 1010. Record 1527 contains digital data, which is a type of signal, to be written into program memory 2083 of programmable array 2070 on assembly 2000. (See FIG. 7) In other words, record 1527 contains a digital programming signal to be written into program memory 2083 of programmable array 2070 on assembly 2000. Record 1537 contains a different digital programming signal to be written into program memory 2083 in programmable array 2070 on programmable assembly 2300. (See FIG. 9).

Assembly 2000 includes circuitry 2004, responsive to a signal on VME bus 1010, for recognizing the VME bus address of assembly 2000. Assembly 2300 includes circuitry 2304, responsive to the signal on VME bus 1010, for recognizing the VME bus address of assembly 2300, which is different from the VME bus address of assembly 2000. Controller board 1060 includes circuitry 1064, responsive to the signal on VME bus 1010, for recognizing the VME bus address of assembly controller board 1060, which is different from the VME bus addresses of both assembly 2000 and assembly 2300.

Figure 3:
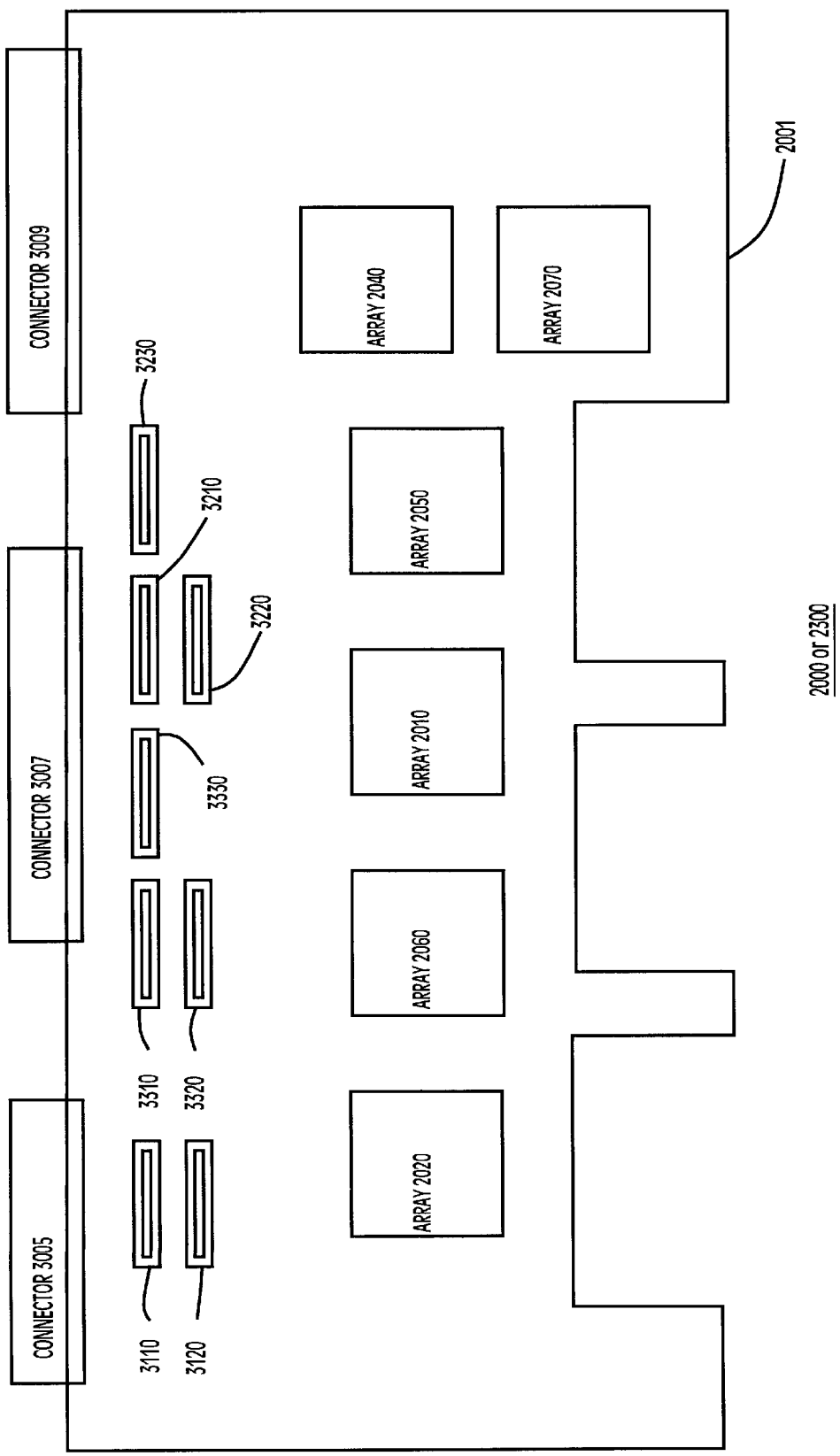
FIG. 3 is a plan view showing a mechanical structure common to each programmable circuit assembly in the digital processing kiosk of FIG. 2.

FIG. 3 is a plan view showing a mechanical layout that is common to both circuit assembly 2000 and circuit assembly 2300. Packages 2010, 2020, 2040, 2050, 2060, and 2070 are each a XILINX 5215 programmable logic array. Each of these array packages is soldered to a substrate (circuit board 2001) and is directly connected to a FIFO memory package (not shown in FIG. 3). Each FIFO memory package is mounted on the reverse side of board 2001, opposite its corresponding programmable array.

Connectors 3310, 3320, and 3330 constitute a first set of connectors corresponding to the Physical and Environmental Layers for PCI Mezzanine Card, IEEE P1 386.1/Draft 2.0, Apr. 4, 1995, commonly known as the PMC standard. Connectors 3210, 3220, and 3230 constitute a second set of connectors conforming to the PMC standard. Connectors 3110 and 3120 constitute a third set of connectors conforming to the PMC standard. Each connector is 64 pins. A circuit available in the PMC form factor is a telemetry frame synchronizer conforming to the CCSDS (Consultative Committee for Space Data Systems) recommendations. Another circuit available in the PMC form factor is an ATM network interface.

Connectors 3005, 3007, and 3009 are for mechanically supporting the assembly in kiosk 1000, and for electrically coupling the assembly to other circuitry within kiosk 1000. Connector 3005 is a VME P1 connector and connector 3007 is a VME P2 connector.

The mechanical structure of the assembly shown in FIG. 3 conforms to the 9UVME Form Factors standard.

Figure 4B:
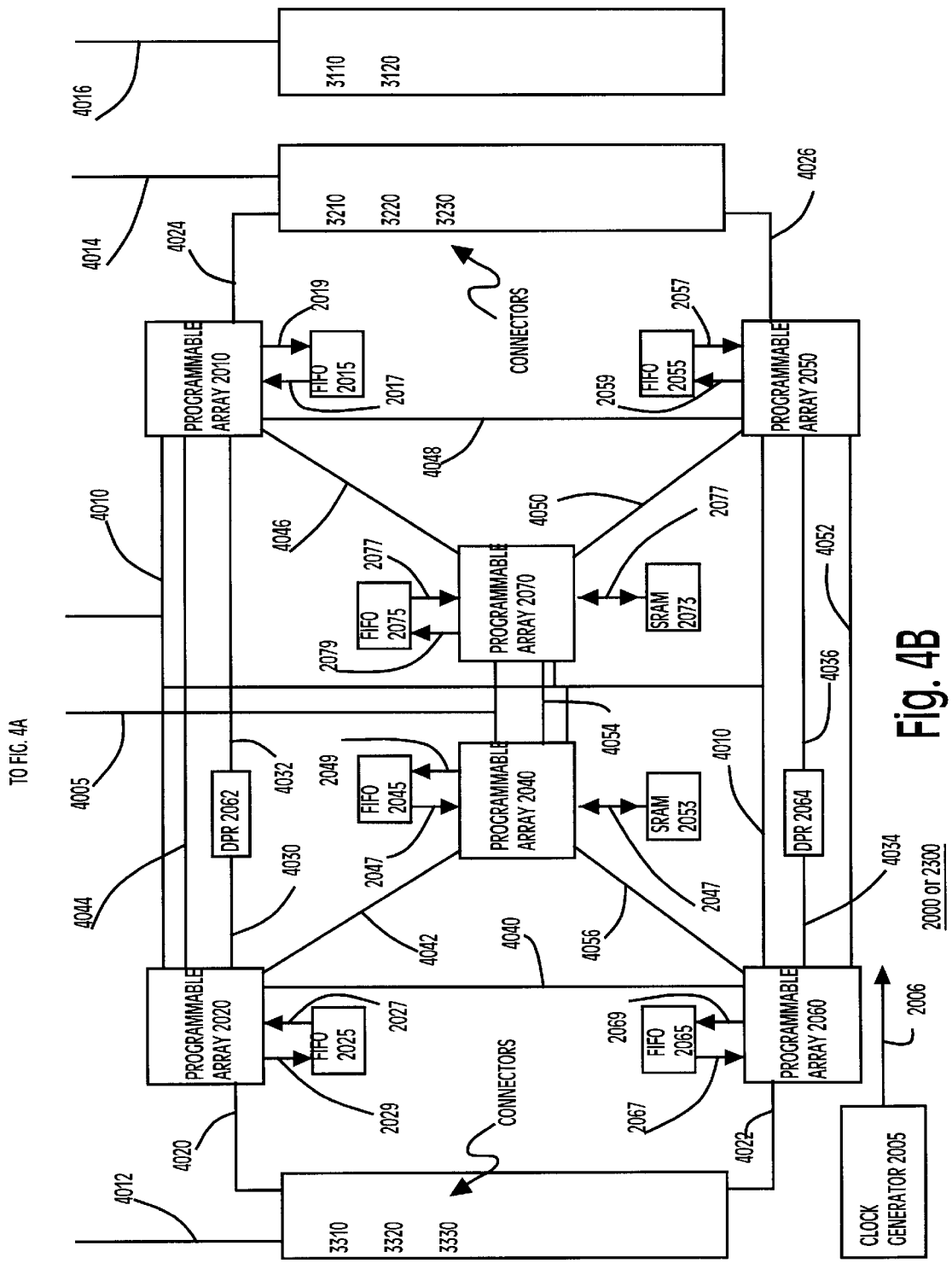

FIGS. 4A and 4B are a block diagram showing some devices and metallic current paths common to both assembly 2000 and assembly 2300. In FIGS. 4A and 4B, each of device packages 2219, 2210, 2215, 2020, 2025, 2062, 2010, 2015, 2045, 2040, 2053, 2075, 2070, 2073, 2065, 2060, 2064, 2055, and 2050 represents a device package, including an insulating material encapsulating an integrated circuit, and metallic package leads (interface contacts) bonded to the outside of the package and soldered to the substrate 2001 of the assembly. Each package lead is connected, through the insulating material, to a node of the integrated circuit. The respective spatial location of each package on substrate 2001 is common to both assemblies 2000 and 3000. In other words, the mechanical layout of the packages shown in FIGS. 4A and 4B is common to both assemblies 2000 and 2300.

In FIGS. 4A and 4B, drawing line 2006 represents a single clock line, and each of the remaining drawing lines represents a set of parallel metallic current paths commonly known as a 'bus'. Each bus depicted in FIG. 4B is an unbuffered, contiguous, metallic current path between device packages. In other words, each bus depicted in FIG. 4B is a current path between device packages, without any intervening semiconductor device.

In FIGS. 4A and 4B, each junction between a bus and a device package represents a connection between each line of the bus and a respective interface contact on the exterior of the package. Each such junction between a bus and one of the programmable arrays 2020, 2010, 2040, 2070, 2060, and 2050 represents a connection between each line of the bus and a respective programmable I/O pin (interface contact) in the programmable array, which are described more fully in connection with FIG. 15.

Thus, each connection between device packages shown in FIG. 4A represents a set of parallel current paths first and second packages, each current path having a first end connected to a respective interface contact on the first package and a second end connected to a respective interface contact on the second package.

Assemblies 2000 and 2300 each communicate with other parts of kiosk 1000 via VME64 to PCI bridge chip 2219 coupled between VME bus 1010 and PCI bus 2017. (See PCI Local Bus Specification, Rev.2.1, PCI Special Interest Group). Chip 2219 is available from Tundra Semiconductor Corporation, Inc. as part number CA91C042-33CE.

PCI bus 2017 is directly connected to each of the 3 PMC connector sets described above. PCI bus 2017 is coupled to each programmable array via PLX 9060 i960 to PCI bridge chip package 2210 and AMD MACH decode chip package 2015. Bridge chip package 2210 is coupled to bus 4005, which has an i960 bus structure. Bus 4005 includes 74 parallel metallic signal lines, including 32 lines connected to the data pins of package 2210, 32 lines connected to the address pins of package 2210, and 10 lines connected to the control pins of package 2210.

Package 2215 includes a decoder for generating and sending signals on 28-line bus 4010 in response to recognizing certain values on bus 4008. Bus 4010 includes 16 lines for data, 4 lines for address, 6 chip select lines, a read/write line, and a reset line. Each of the 6 programmable arrays shown in FIG. 4B is connected to a respective one of the 6 chips select lines, meaning that each programmable array is not connected to the remaining 5.

Bus 4012 includes 58 parallel lines coupled between the first PMC connector set and PCI buss 2017. Connectors 3310 and 3320 are connected to the PCI bus. Bus 4020 includes 20 parallel lines connected between connector 3330 and array 2020. Bus 4022 includes 20 parallel lines connected between the connector 3330 and array 2060.

Bus 4014 includes 58 parallel lines connected between the second PMC connector set and PCI buss 2017. Bus 4024 includes 20 parallel lines connected between the second PMC connector set and array 2010. Bus 4026 includes 20 parallel lines connected between the second PMC connector set and array 2050.

Bus 4016 includes 58 parallel lines connected between the third PMC connector set and PCI buss 2017.

Programmable array 2070 is available from Xilinx, Inc. as XILINX 5215. Array 2070 includes 304 metallic interface contacts, of which 244 are user programmable I/O pins (interface contacts) connected in assembly 2000. Array 2070 includes a program memory that may be written into via buss 4010. Array 2070 contains circuitry to generate logic and routing functions, depending on the contents of the program memory. Each interface contact is connected to the output of a respective tri-state driver. The input of each driver is connected to a respective block of programmable logic driven by the programmable functions in array 2070. Thus, each output circuit is configured to generate a logic function defined by the contents of the program memory.

First-In-First-Out(FIFO) package 2075 is available from Integrated Device Technology, Inc. as part number IDT72245LB. FIFO package 2075 includes a 4096×18-bit memory array, a write pointer register, a read pointer register, control logic, and interface contacts including a write enable pin, a write clock pin, a read enable pin, a read clock pin, 18 data in pins, 18 data out pins, and 4 flag pins: "full," "almost full," "empty," and "almost empty." The read clock pin may be driven asynchronously to the write clock pin. When write enable is asserted, control logic in FIFO package 2075 increments the write pointer register on each cycle of the write clock. When read enable is asserted, the control logic in FIFO package 2075 increments the read pointer register on each cycle of the read clock.

Each line of bus 2079 is a contiguous, metallic current path between a respective pin of FIFO 2075 and a respective pin on array 2070. Metallic bus 2079 includes 21 parallel lines for writing into FIFO 2075, including 18 data lines each coupled to a respective one of the 18 data in pins, a write enable line connected to the write enable pin, and flag line coupled to the "full" pin and another flag line connected to the "almost full" pin.

Each of busses 2029, 2069, 2049, 2059, and 2019 is connected between a respective programmable array and a respective FIFO, to make the same interconnections as those described for bus 2079, programmable array 2070 and FIFO 2075. Bus 2029 includes 21 parallel lines for writing into FIFO 2025, bus 2069 includes 21 parallel lines for writing into FIFO 2065, bus 2049 includes 21 parallel lines for writing into FIFO 2045, bus 2019 includes 21 parallel lines for writing into FIFO 2015, and bus 2059 includes 21 parallel lines for writing into FIFO 2055.

Each line of bus 2077 is a contiguous, metallic current path between a respective pin of FIFO 2075 and a respective pin on array 2070. Metallic bus 2077 includes 21 parallel lines for reading from FIFO 2075, including 18 data lines connected to the 18 data out pins, a read enable line connected to the read enable pin, and a flag line connected to the empty pin, and another flag line connected to the almost empty pin.

Each of busses 2027, 2067, 2047, 2057, and 2017 is connected between a respective programmable array and a respective FIFO, to make the same interconnections as those described for bus 2077, programmable array 2070 and FIFO 2075. Bus 2027 includes 21 parallel lines for reading from FIFO 2025, bus 2067 includes 21 parallel lines for reading from FIFO 2065, bus 2047 includes 21 parallel lines for reading from FIFO 2045, bus 2017 includes 21 parallel lines for reading from FIFO 2015, and bus 2057 includes 21 parallel lines for reading from FIFO 2055.

Because each FIFO is directly connected for both reading and writing by a respective programmable array, each FIFO can be employed for bidirectional data buffering. For example, FIFO 2075 may serve as a buffer for data transfers from logic array 2070 to PCI bus 2017, via metallic bus 4005, by setting certain data in the programming memory of logic array 2070. FIFO 2075 may also serve as a buffer for data transfers from PCI bus 2017, via metallic bus 4005, by setting different data in the program memory of logic array 2070. Thus, FIFO 2075 effectively acts as a bidirectional buffer between logic array 2075 and PCI bus 2017, as described in more detail below.

Dual port ram package (DPR) 2062 is available from Integrated Device Technology (IDT) as part number IDT7025S25PF. DPR 2062 includes a 8192×16-bit memory array and first and second access ports. Each access port has 34 interface contacts, including 13 interface contacts for address, 16 interface contacts for data, a contact for chip enable, a contact for output enable, a contact for read/write, a contact for lower byte enable for accessing individual bytes within a word, and a contact for upper byte enable for accessing individual bytes within a word.

Metallic bus 4032 includes 34 parallel lines for accessing DPR 2062. Each line of bus 4032 is a contiguous, metallic connection between a respective pin of DPR 2062 and a respective pin on array 2010. More specifically, each line of bus 4032 is a contiguous, metallic connection between a respective pin of the first access port of DPR 2062 and a respective pin on array 2010.

Metallic bus 4030 includes 34 parallel lines for accessing DPR 2062. Each line of bus 4030 is a contiguous, metallic connection between a respective pin of DPR 2062 and a respective pin on array 2020. More specifically, each line of bus 4030 is a contiguous, metallic connection between a respective pin of the second access port of DPR 2062 and a respective pin on array 2020.

DPR 2064 is the same part as DPR 2062. Metallic bus 4036 includes 34 parallel lines for accessing DPR 2064. Each line of bus 4036 is a contiguous, metallic connection between a respective pin of DPR 2064 and a respective pin on array 2050. More specifically, each line of bus 4036 is a contiguous, metallic connection between a respective pin of the first access port of DPR 2064 and a respective pin on array 2050.

Metallic bus 4034 includes 34 parallel lines for accessing DPR 2064. Each line of bus 4034 is a contiguous, metallic connection between a respective pin of DPR 2064 and a respective pin on array 2060. More specifically, each line of bus 4036 is a contiguous, metallic connection between a respective pin of the second access port of DPR 64 and a respective pin on array 2060.

Each of busses 4040, 4044, 4048, 4052, and 4054, includes 40 contiguous, parallel, metallic signal lines for connecting two respective programmable arrays.

Each of busses 4042, 4046, 4050, and 4056 include 20 contiguous, parallel, metallic signal lines for connecting to respective programmable arrays.

Clock generator circuitry 2005 generates a clock signal and sends the clock signal over signal line 2006. Signal line 2006 is connected to each of programmable arrays 2010, 2050, 2070, 2040, 2060, and 2020. Signal line 2006 is also connected to each of FIFOs 2015, 2055, 2075, 2045, 2065, and 2025. To facilitate the clarity of the drawings, this connection of signal line 2006 is not explicitly shown in FIG. 4B.

Figure 5:
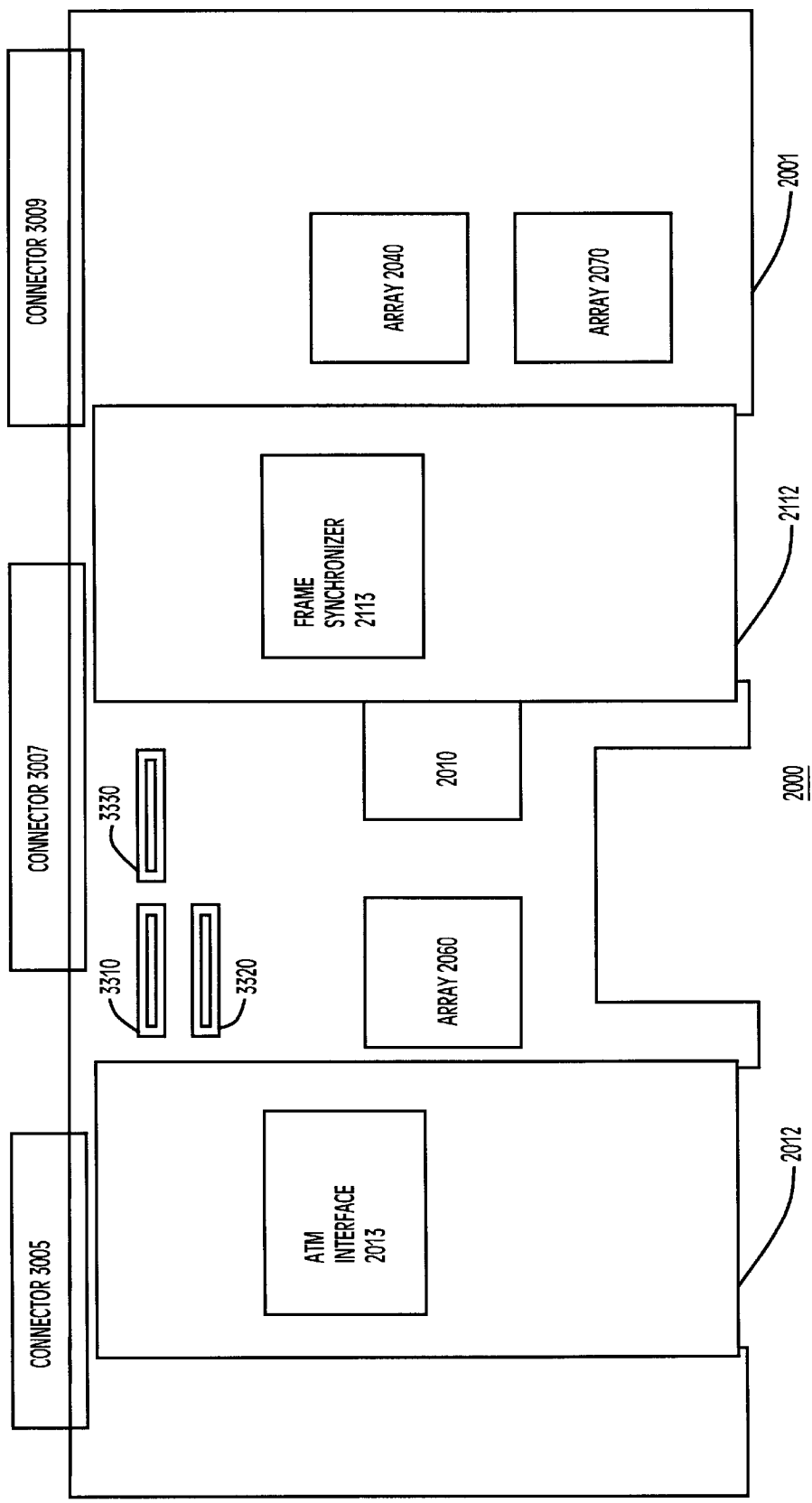
FIG. 5 is a plan view showing a mechanical layout of a certain one of the programmable assemblies in the digital processing kiosk.

FIG. 5 is a plan view showing programmable assembly 2000 including PMC mezzanine card 2112 plugged into the first connector set. Frame synchronizer 2113 is mounted on PMC mezzanine card 2112. PMC mezzanine card 2012 is plugged into the third connector set. ATM interface chip 2013 is mounted on card 2012.

Figure 6:
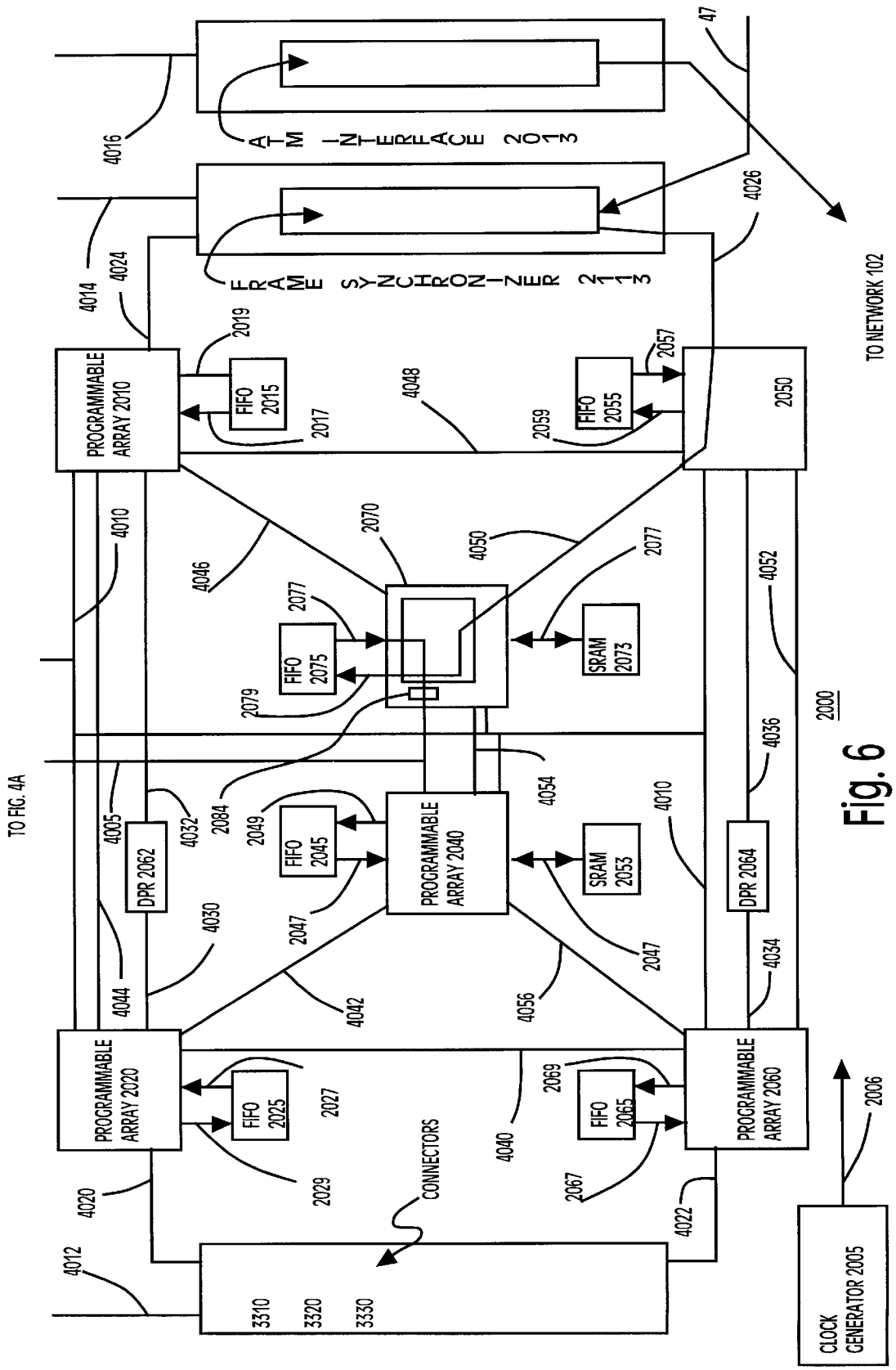
FIG. 6 is a block diagram showing circuitry in the programmable assembly shown in FIG. 5.

FIG. 6 shows some devices and metallic signal lines in programmable assembly 2000, including frame synchronizer package 2113 on mezzanine card 2112, and ATM package 2013 on mezzanine card 2012. Frame synchronizer 2113 receives telemetry data on line 47. Down stream from frame synchronizer 2113, virtual circuitry in array 2050 receives a telemetry signal from frame synchronizer 2113, and generates and sends a processed telemetry signal to virtual circuitry in programmable array 2070.

Virtual circuitry in switching matrix 2082 in programmable array 2070 routes the telemetry data received over bus 4005 to FIFO 2075. Programmable array 2070 employs FIFO 2075 to buffer data coming from programmable array 2050. After FIFO 2075 has buffered up a sufficient size block (typically 1 or 2K) for an efficient contiguous data transfer, programmable array 2070 reads the block from FIFO 2075 and sends the block to ATM interface 2013 via bus 4005 and PCI bus 2017 (See FIG. 4A). While making this contiguous transfer, virtual circuitry 2084 further processes the telemetry data. ATM interface 2013 then sends a corresponding data packet to another node in network 102.

Figure 7:
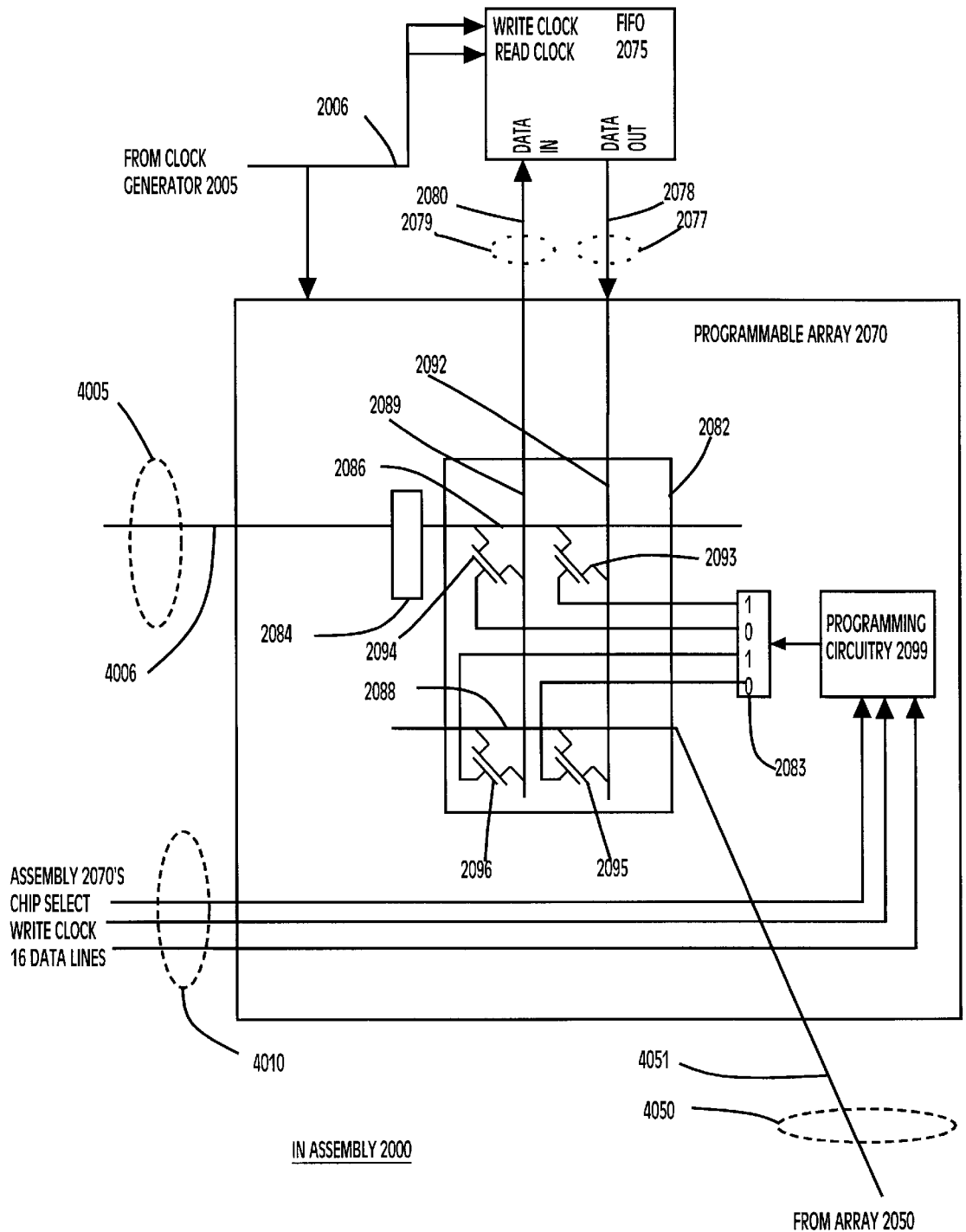
FIG. 7 is a diagram emphasizing signal paths in a portion of the circuitry shown in FIG. 6.

FIG. 7 is a simplified diagram emphasizing signal paths in switching matrix 2082 in array 2070 on assembly 2000. In FIG. 7, each junction between a signal line and the perimeter of programmable array 2070 represents a connection between a metallic current path on substrate 2001 and a package lead (interface contact) on the exterior of array 2070.

Matrix 2082 includes rows and columns of metallic signal lines. The rows of the matrix are connectable to the columns of the matrix with respective pass transistors. For clarity of description, only one data bit line 4051 of 18 data bit lines in bus 4050 bus is explicitly shown in FIG. 7. Similarly, only one data bit line 4006 in bus 4005 is explicitly shown; only one data bit line 2080 in bus 2079 is explicitly shown; only one data bit line 2078 in bus 2077 is explicitly shown. Each of the remaining 17 data bit lines is switched through a respective set of matrix connections.

Thus, FIFO 2075 includes a first metallic interface contact, represented by the junction between FIFO 2075 and bit line 2080, for writing into FIFO 2075; and a second metallic interface contact, represented by the junction between FIFO 2075 and bit line 2078, for reading from FIFO 2075. Bit line 2080 is a first signal path connected between array 2070 and the first interface contact of FIFO 2075, and bit line 2078 is a second signal path connected between the array 2070 and the second interface contact of FIFO 2075.

Row 2086 is connectable to column 2089 via pass transistor 2094. Row 2086 is connectable to column 2092 via pass transistor 2093. Row 2088 is connectable to column 2089 via pass transistor 2096. Row 2088 is connectable to column 2092 via pass transistor 2095. The gate of each pass transistor is connected to a respective memory location in program memory 2083. Although only 4 bits are explicitly shown in program memory 2083, the XILINX 5215 program memory actually contains 237,744 bits.

When kiosk 1000 was powered up, a series of programming signals sent from workstation 1500 via controller board 1060, VME bus 1010, PCI bus 2010, and bus 4010 caused programming circuitry 2099 of each programmable array to write into program memory 2083 of each programmable array assembly 2000. Similarly, a series of programming signals originating at workstation 1500 cause programming circuitry 2099 of each programmable array on assembly 2300 to write into program memory 2083 of each programmable array on assembly 2300. More specifically, controller board 1060 addresses array 2070 on assembly 2000, sends a control signal to array 2070 of assembly 2000, and then sends the contents of record 1527 over bus 4010, causing programming circuitry 2099 to write the contents of record 1527 into program memory 2083, thereby determining the current signal paths in switching matrix 2082, and determining other routing and logic functions in array 2070. Next, controller board 1060 addresses programmable array 2070 on programmable assembly 2300, sends a control signal to array 2070 of assembly 2300 to enable writing into program memory 2083 of this instance of array 2070, and sends the contents of record 1537 over bus 4010, causing programming circuitry 2099 and array 2070 of assembly 2300 to write the contents of record 1537 into memory 2083 of array 2070 of assembly 2300.

As shown in FIG. 7, the memory location, in program memory 2083, corresponding to transistor 2093 contains a 1, the memory location corresponding to transistor 2094 contains a 0, the memory location corresponding to transistor 2096 contains a 1, and the memory location corresponding to transistor 2095 contains a 0, meaning that row 2088 has a current path to column 2089 and row 2088 does not have a current path to column 2092, row 2086 has a current path to column 2092, and row 2086 does not have a current path to column 2089. With array 2070 thus programmed, FIFO 2075 acts as a buffer for data going to bus 4005.

As shown in FIG. 7, both the read clock and write clock of FIFO 2075 is driven by signal line 2006, which carries the clock signal generated by clock generator 2005. One of the interface contacts of array 2070 is also driven by signal line 2006. Each FIFO and each programmable array in the programmable assemblies in the preferred embodiments of the present invention are driven by signal line 2006 as shown in FIG. 7.

Thus, assembly 2000 includes a programmable package 2070 with a plurality of interface contacts, a memory 2083, and a plurality of programmable input/output (I/O) circuits, each I/O circuit connected to a respective interface contact, each I/O circuit configured to generate a logic function defined by a contents of memory 2083 memory.

Figure 8:
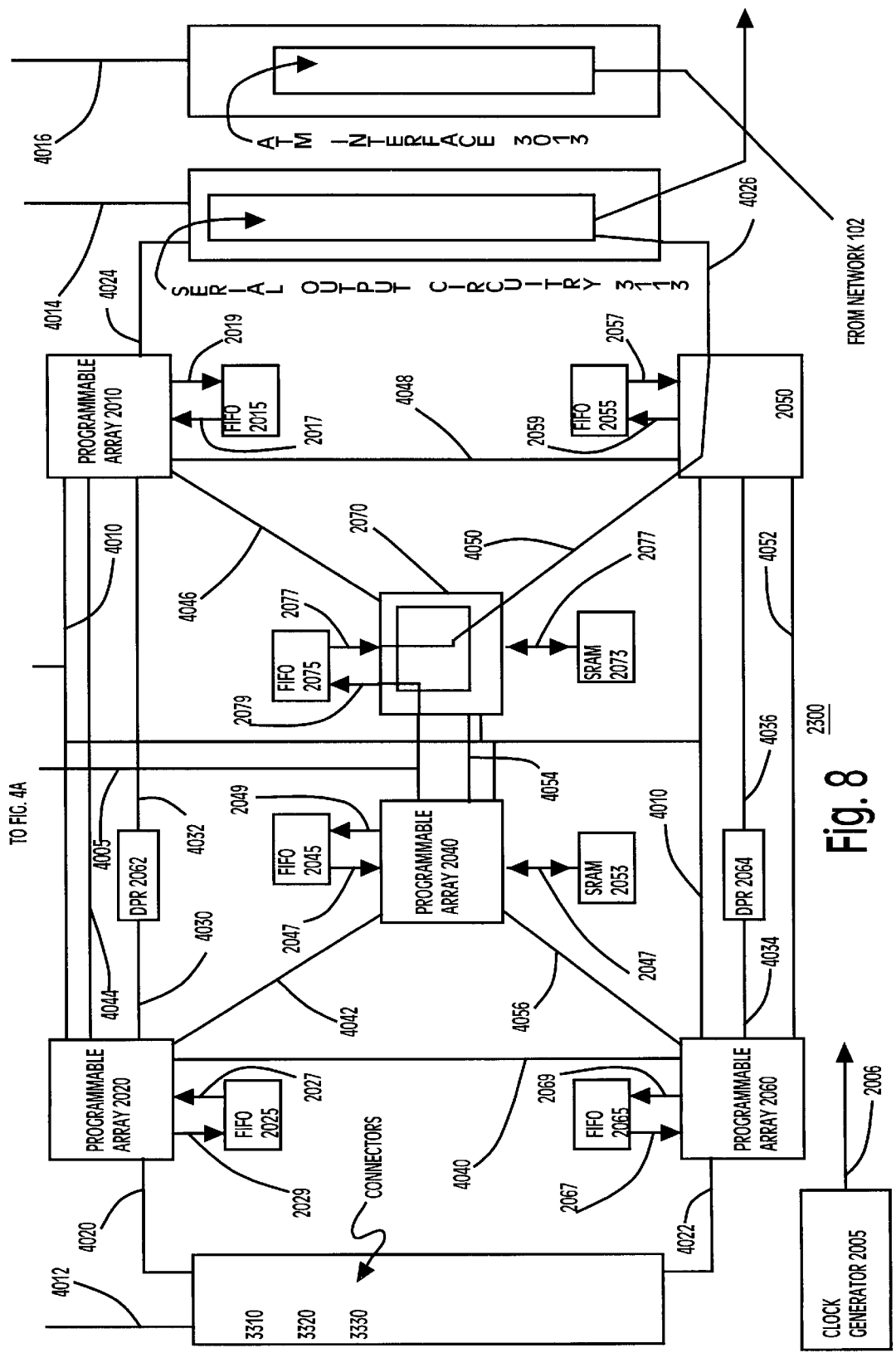
FIG. 8 is a block diagram showing circuitry in a second one of the programmable assemblies in the digital processing kiosk.

FIG. 8 shows some devices and metallic signal lines in program assembly 2300, including serial output circuitry 3113 on mezzanine card 3112, and ATM package 3013 on mezzanine card 3012. ATM package 3013 receives data packets from network 102. ATM circuitry 3013 sends corresponding data blocks to array 2070 via PCI bus 2017 and bus 4005. Array 2070 employs FIFO 2075 to buffer data coming from bus 4005. Down stream from array 2070, array 2050 receives a signal from array 2070 and generates and sends a corresponding signal to serial output circuitry 3113. In response, serial output circuitry 3113 sends a corresponding serial bit stream to RF processing circuitry 45, via signal cable 43. In response, RF processing circuitry transmits a command signal to satellite 25.

Figure 9:
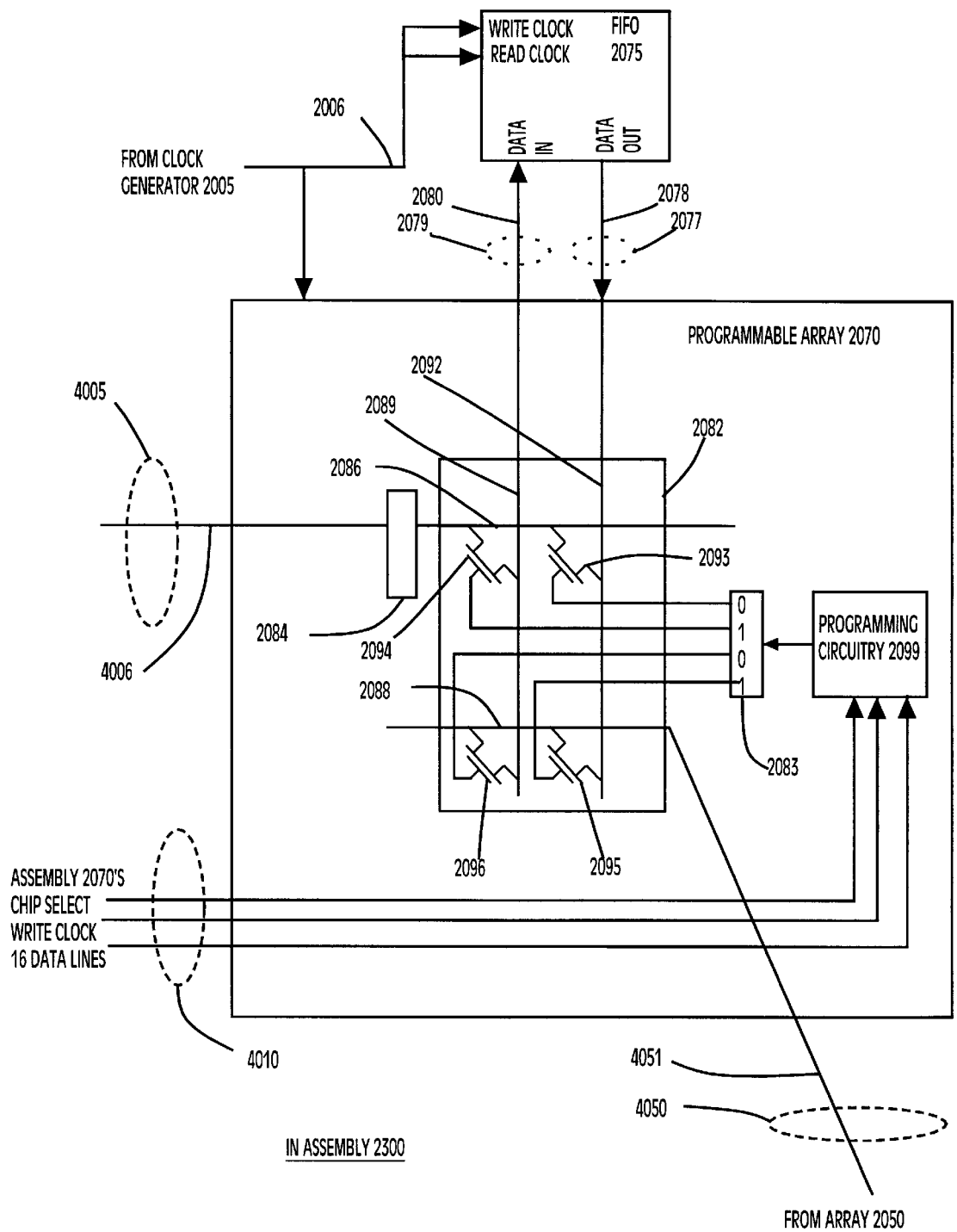
FIG. 9 is a diagram emphasizing signal paths in part of the circuitry shown in FIG. 8.

FIG. 9 is a diagram emphasizing signal paths in switching matrix 2082 in array 2070 on assembly 2300. When kiosk 1000 was powered up, a series of programming signals sent from workstation 1500 via controller board 1060, VME bus 1010, PCI bus 2010, and bus 4010 caused programming circuitry 2099 to write into program memory 2083, thereby determining the current paths in switching matrix 2082 of array 2070 of assembly 2300.

As shown in FIG. 9, the memory location, in program memory 2083, corresponding to transistor 2093 contains a 0, the memory location corresponding to transistor 2094 contains a 1, the memory location corresponding to transistor 2096 contains a 0, and the memory location corresponding to transistor 2095 contains a 1, meaning that row 2088 does not have a current path to column 2089 and row 2088 has a current path to column 2092, row 2086 does not have a current path to column 2092, and row 2086 has a current path to column 2089. With array 2070 thus programmed, FIFO 2075 acts as a buffer for data coming from bus 4005.

Thus, FIFO 2075 on programmable assembly 2000 buffers data going to bus 4005, while FIFO 2075 on programmable assembly 2300 buffers data coming from bus 4005.

Second Preferred Embodiment

Figure 10:
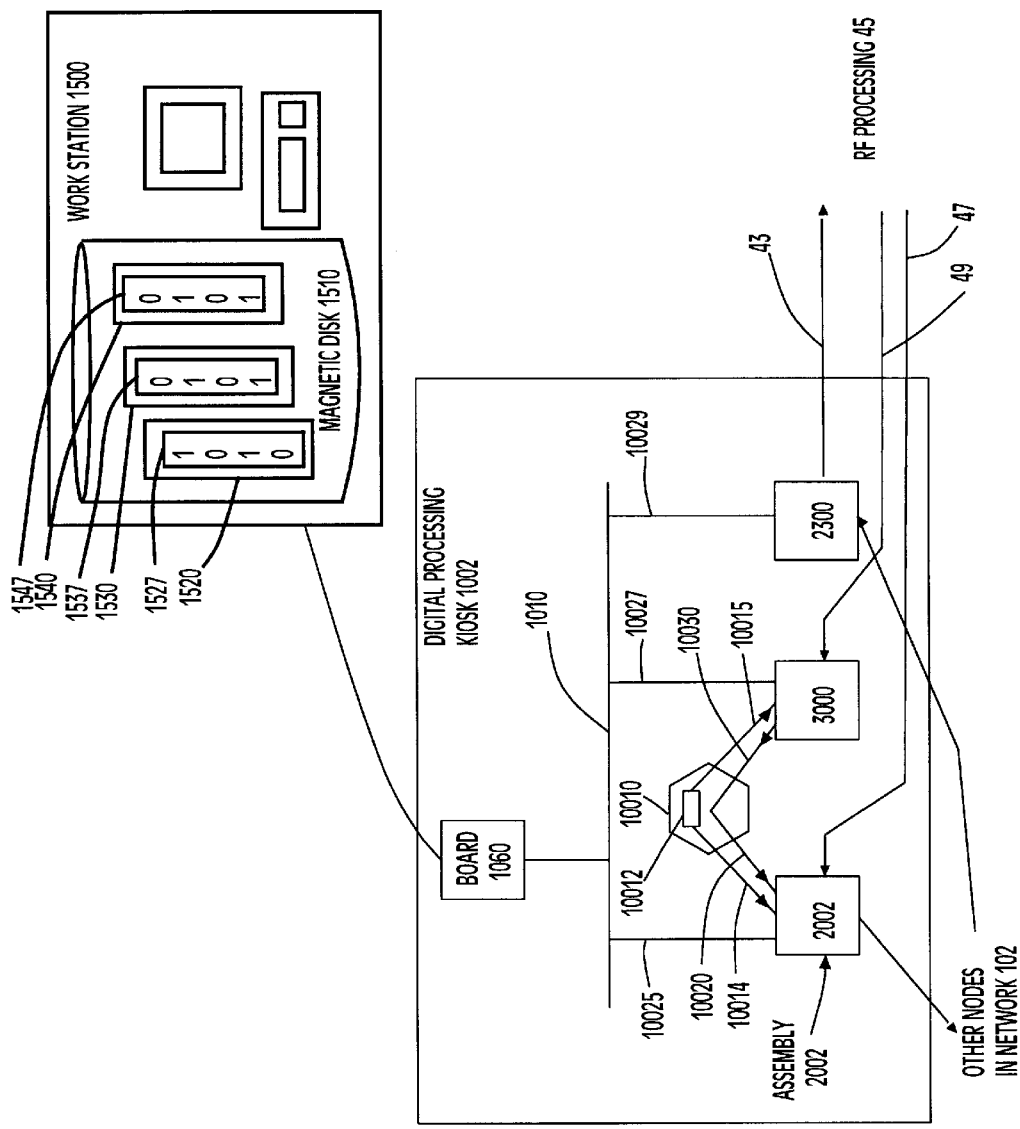
FIG. 10 is a diagram of a digital processing kiosk in accordance with a second preferred embodiment of the present invention.

FIG. 10 shows digital processing kiosk 1002 according to a second preferred embodiment of the present invention. The second preferred embodiment is similar to the first preferred embodiment and labeled with corresponding reference numbers. The second preferred embodiment includes another telemetry signal cable 49 for carrying telemetry, from RF processing section 45, representing an additional satellite channel. Programmable assembly 3000 is connected to cable 49. Assembly 3000 sends telemetry data to programmable assembly 2002, via high bandwidth, cross point interconnect 10010. File 1527 contains programming data for initializing assembly 2002, and file 1547 contains programming data for initializing assembly 3000, as described in connection with files 1520 and 1530 and assemblies 2000 and 2300 of the first preferred system.

Assemblies 2002 and 3000 share the common mechanical layout represented in FIG. 3 in connection with the first preferred system, and share the common devices and metallic signal represented in FIG. 4A and 4B in connection with the first preferred system. Assemblies 2002 and 3000 share the common package layout described in connection with the first preferred system.

Interconnect 1050 conforms to the RACEWAY Interlink ANSI/VITA 5-1994, American National Standards Institute, Inc. approved Jul. 31, 1995. Interconnect 10010 provides a high bandwidth path for telemetry data between assembly 3000 and assembly 2002. Interconnect 10010 employs P2 connectors and provides bidirectional connectivity between assemblies 3000 and 2002 through a network of crossbar switches with point-to-point interconnects. Interconnect 10010 has six 32-bit-wide ports. Any port can be connected to any other port. As shown in FIG. 10, kiosk 1002 is currently using only two ports, a port to receive telemetry data from assembly 3000 via 32 bit signal bus 10030, and a port to relay the received telemetry data to assembly 2002 via 32 bit signal bus 10020.

Figure 11:
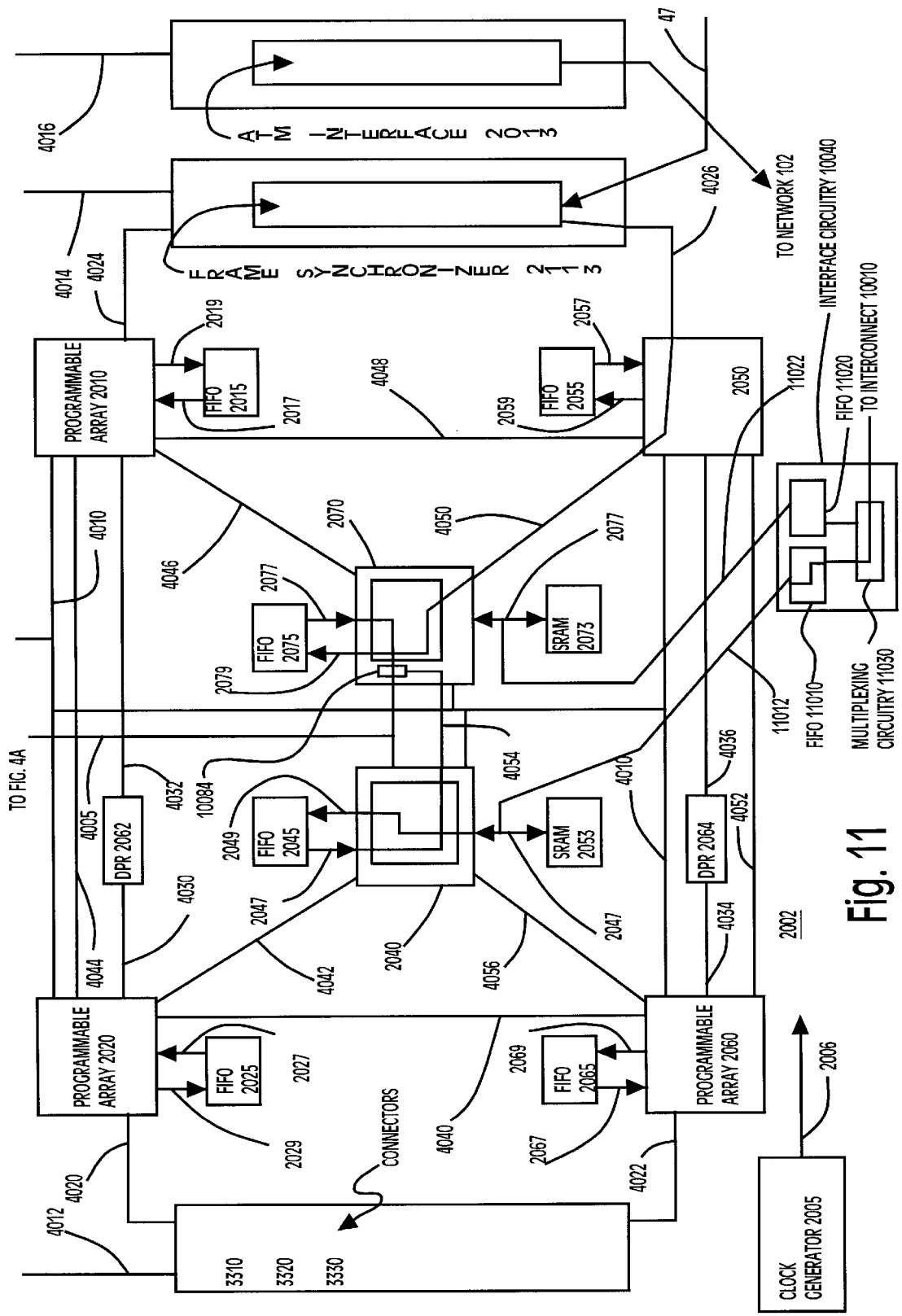
FIG. 11 is a block diagram of a programmable assembly in the second preferred system.

FIG. 11 shows programmable assembly 2002 in more detail. Programmable assembly 2002 includes a Raceway interface 10040 connected to signal lines 2077 between programmable array 2070 and static random access memory (RAM) 2073, and connected to signal lines 2047 between programmable array 2040 and static RAM 2053. Interface circuitry 10040 includes a bidirectional synchronous FIFO memory package 11010, which is available from integrated Device Technology Inc. as part number IDT23622. Interface circuitry 10040 also includes FIFO 11020, which is the same part type as that of FIFO 1010. Interface circuitry 10040 also includes multiplexing circuitry 11030 for sending data to or from either signal lines 2047 or signal lines 2077. Signal line 11012 is 32 bit lines wide, each bit line connected to a respective bit line of bus 2047. Bus 11022 is 32 bit lines wide, each bit line connected to a respective bit line of bus 2077.

Similarly to the processing of assembly 2000 of the first preferred embodiment (see FIG. 6), virtual circuitry in switching matrix 2082 in programmable array 2070 of assembly 2002 routes the telemetry data received over bus 4010 to FIFO 2075. Programmable array 2070 employs FIFO 2075 to buffer data coming from programmable array 2050.

In addition, as shown in FIG. 11, virtual circuitry in programmable array 2040 routes the telemetry data received from assembly 3000, via interface 10040, to FIFO 2045. Programmable array 2040 employs FIFO 2045 to buffer data coming from interface 10040. After FIFO 2075 and FIFO 2045 have each buffered up a sufficient size block (typically 1 or 2K) for an efficient contiguous data transfer, array 2070 reads the block from FIFO 2075 while array 2040 reads the block from FIFO 2045. While making the contiguous transfer, virtual circuitry 10084 interleaves the two blocks to generate interleaved telemetry data. Virtual circuitry 10084 sends the interleaved telemetry data to ATM interface 2013 via bus 4005 and PCI bus 2017. ATM interface 2013 then sends a corresponding data packet to another node in network 102.

Figure 12:
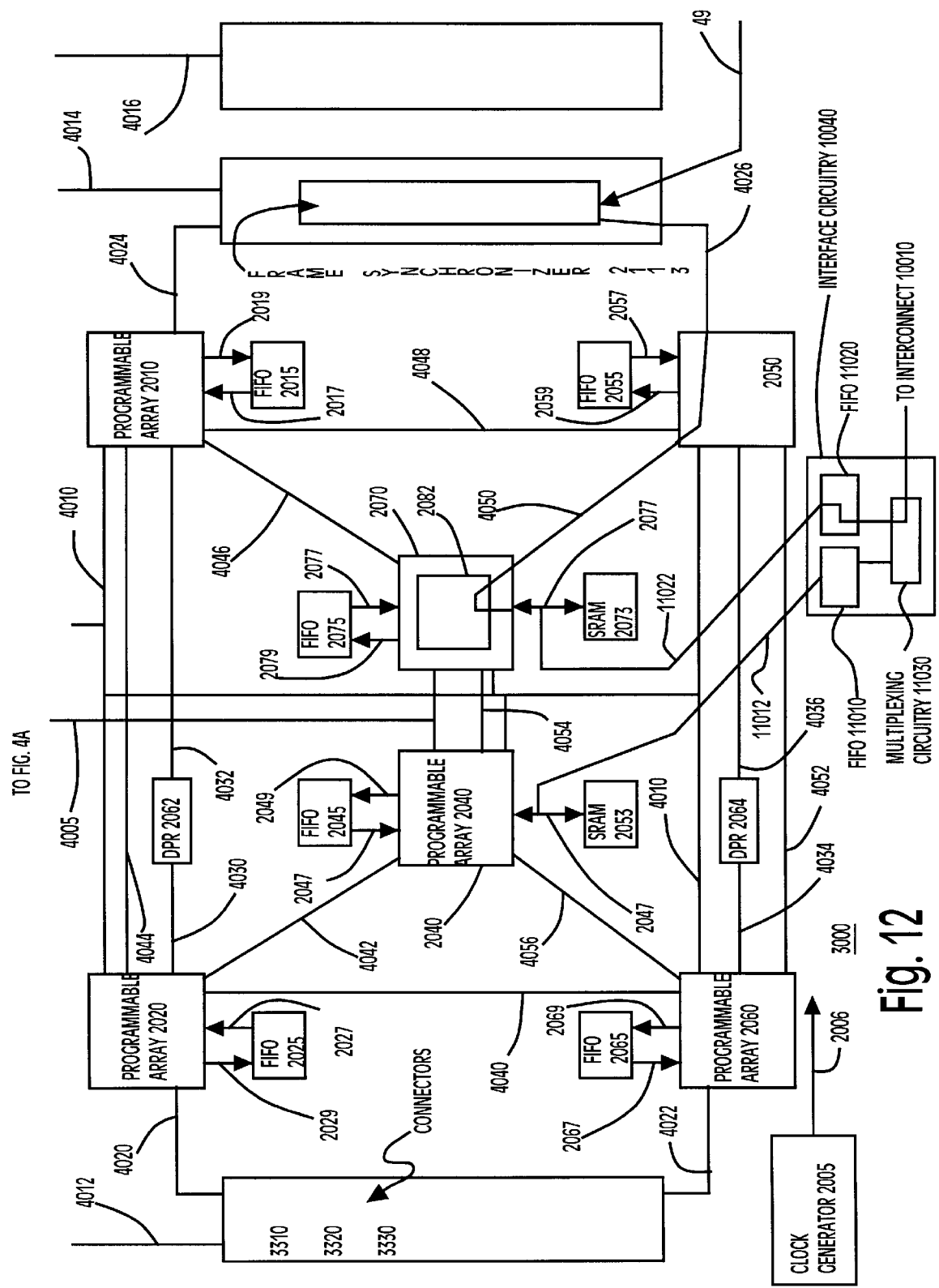
FIG. 12 is a diagram of another programmable assembly in the second preferred system.

FIG. 12 shows programmable assembly 3000 in more detail. Assembly 3000 sends telemetry data over raceway interface 10040 (on assembly 3000) to assembly 2002. Assembly 2002 receives data over the raceway interface 10040 (on assembly board 2002). Assembly 2002 processes this telemetry data from assembly 3000 with telemetry data received from frame synchronizer 2113 on board 2002.

Figure 13:
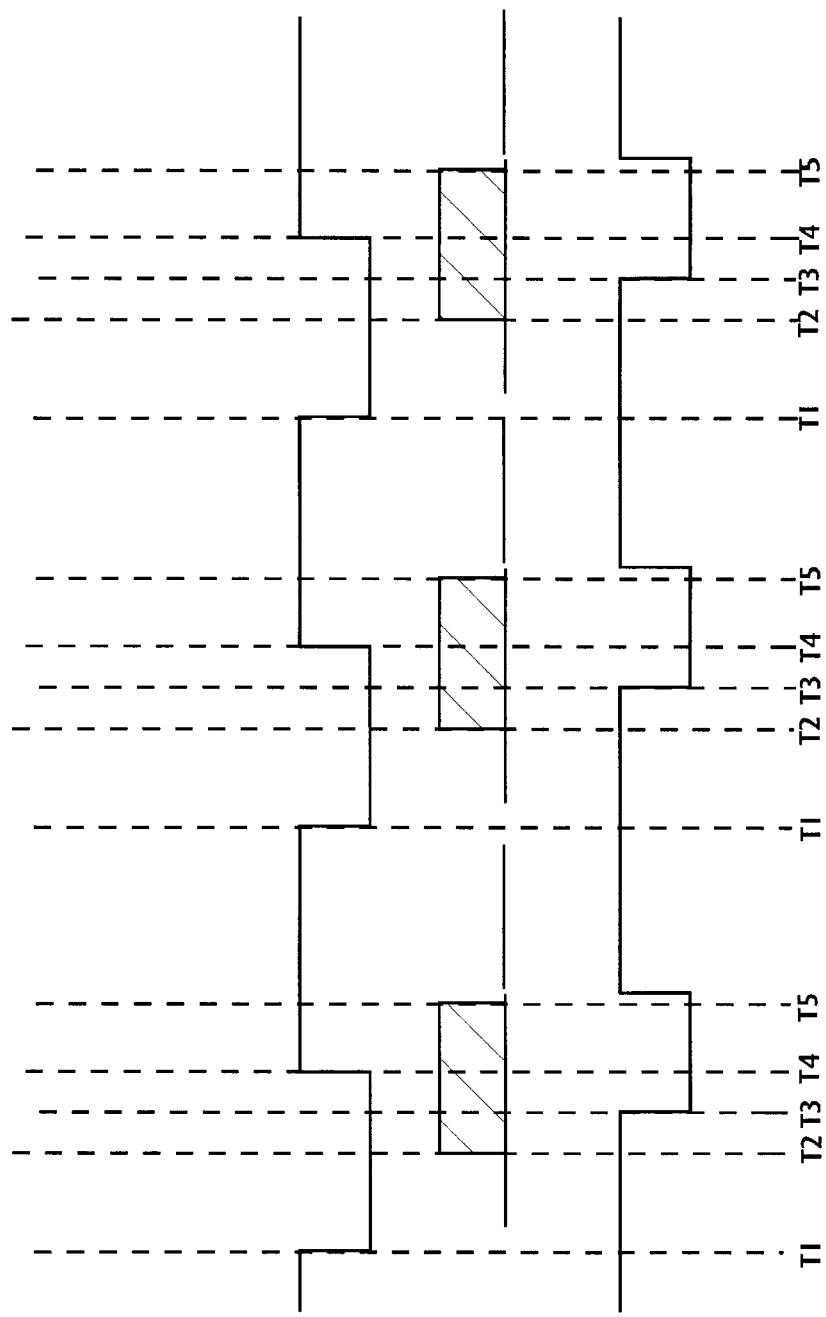
FIG. 13 is a timing diagram showing a data transfer over a VME bus in the digital processing kiosk of the second preferred system.

FIG. 13 is a timing diagram showing some signals when assembly 2002 receives a contiguous block of data over VME bus 1010. FIG. 13 represents processing where, for example, assembly 2002 is receiving programming signals from controller board 1060. At a time T1, board 1060 asserts data strobe low, and subsequently at time T2 asserts data destined for assembly 2002. Subsequently, at time T3 circuitry on assembly 2002 asserts an acknowledge signal on VME bus 1010 via signal line 10025. Subsequently, board 1060 recognizes the acknowledge and terminates the write at time T4 by deasserting data strobe. Board 1060 receives the end of acknowledge from board 2002 at T5, indicating the next transaction can start at the time labeled T1 following T5. Thus, assembly 1060 sends data in response to a signal (bus acknowledge) generated on assembly 2002.

Figure 14:
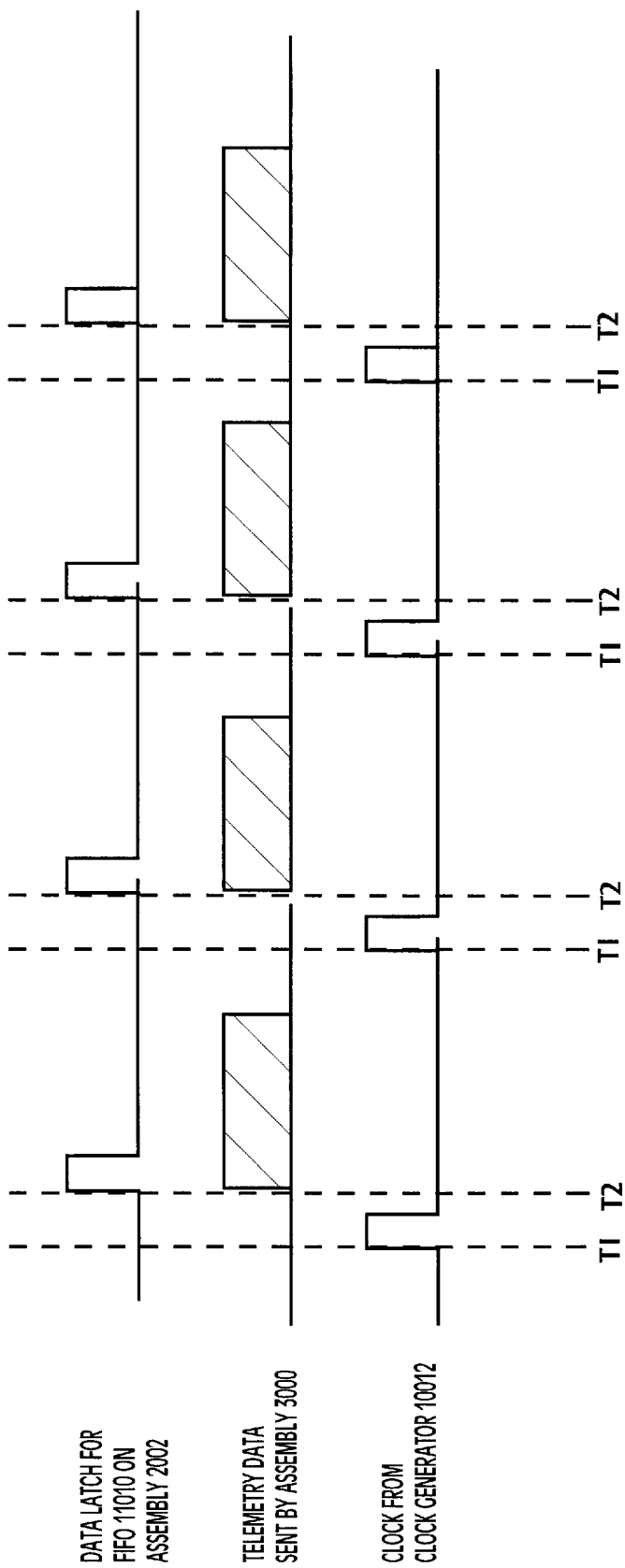
FIG. 14 is another timing diagram showing a data transfer over the high bandwidth interconnect in the digital processing kiosk of the second preferred system.

FIG. 14 is a timing diagram showing the sending of telemetry data through interconnect 10010 synchronous with the clock generated by clock generator 10012 in interconnect 10010. At a time T1 clock generator 10012 generates a rising edge that propagates both over signal line 10015 to assembly 3000 and over signal line 10014 to assembly 2002. Subsequently, at a time T2, in response to receiving the rising edge asserted by clock generator 10012 at T1, assembly 3000 sends a 32 bit data word over data bus 10030. Also at time T2, in response to receiving the rising edge over clock line 10014, circuitry on assembly 2002 generates a signal to latch the data into a FIFO memory in the raceway interface, thereby latching data sent by assembly 3000 in the previous cycle from clock generator 10012. Thus, in response to each rising edge generated by clock generator 10012, assembly 3000 sends a data word and assembly 2002 latches the previous data word. Because clock generator 10012 generates a 40 MHZ signal, and the transferred words are 32 bits long, the effective data rate is 1.2 gigabits per second.

More Detailed Description of the Preferred Embodiments

Figure 15:
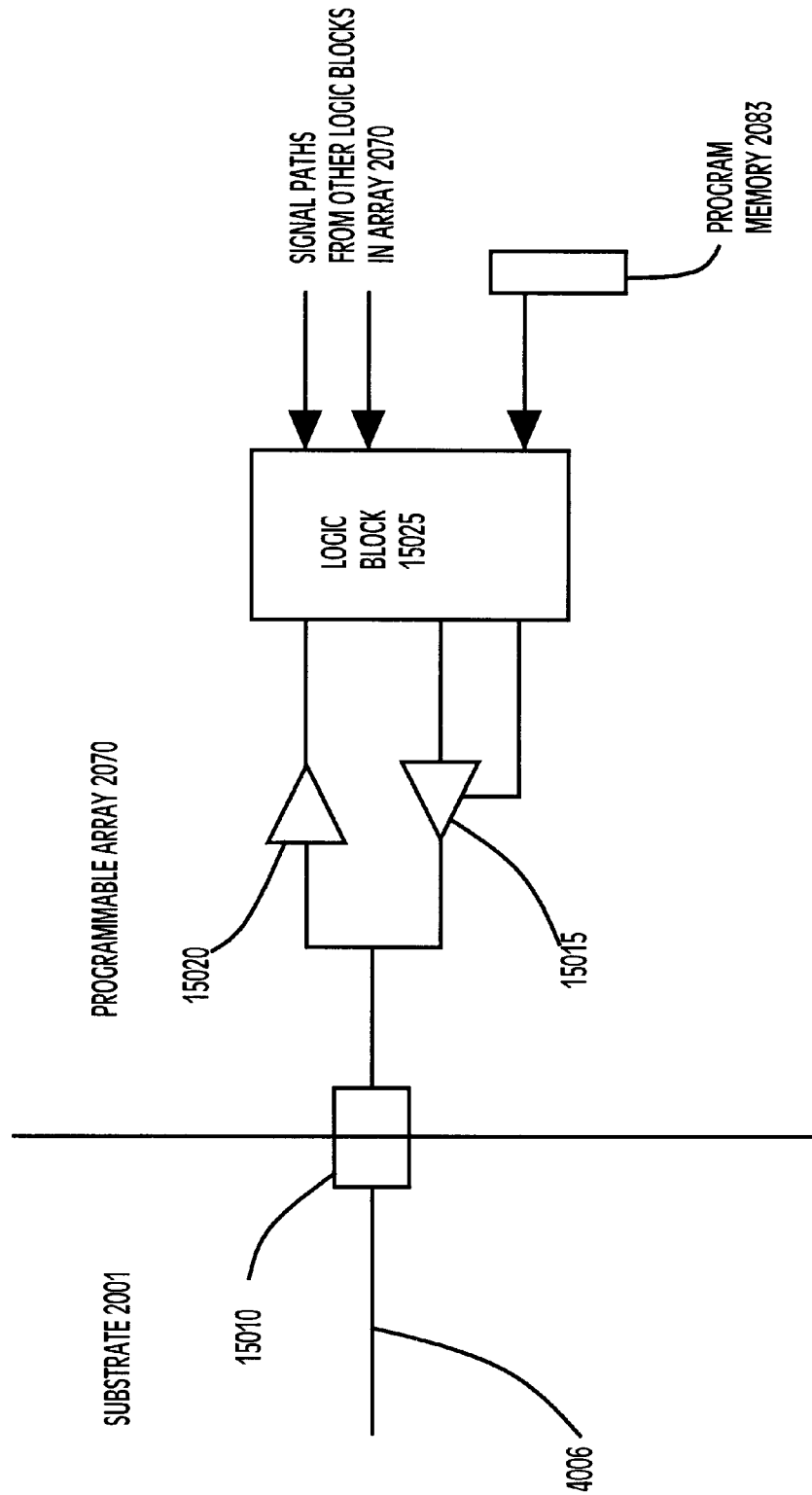
FIG. 15 is a diagram showing some features of each user programmable I/O pin on each programmable array.

FIG. 15 shows some circuitry associated with each programmable user I/O pin (interface contact) of the programmable arrays of the preferred embodiments. In particular, FIG. 15 shows the circuitry represented by the junction between bit line 4006 and programmable array 2070 in FIG. 7. Each programmable user I/O pin in each programmable array of the preferred embodiments has the structure shown in FIG. 15.

Metallic bit line 4006 is connected to metallic interface contact 15010 on the exterior of array 2070. Contact 15010 is connected to both input buffer 15020 and tri-state output driver 15015. The input of driver 15015 is driven by programmable logic block 15025, which generates logic and routing functions depending on the contents of program memory 2083.

Each programmable user I/O pin of array 2070 has the internal structure shown in FIG. 15. Thus, programmable package 2070 has a plurality of interface contacts, a program memory 2083, and a plurality of output circuits, each output circuit connected to a respective interface contact, each output circuit configured to generate a logic function defined by a contents of the memory.

Thus, as shown in FIGS. 2, 6, 7, and 15, work station 1500 and controller board 1060 act to initialize assembly 2000, thereby operating assembly 2000 to send a telemetry signal from bit line 2078, through array 2070, to interface contact 15010. Work station 1500 and controller board 1060 thus initialize assembly 2000 by sending data record 1527, which is essentially a digital programming signal, over VME bus 1010 to program memory 2083, in array 2070, on assembly 2000.

As shown in FIGS. 2, 8, 9, and 15, work station 1500 and controller board 1060 act to initialize assembly 2300, thereby operating assembly 2300 to send a telemetry signal from interface contact 15010, through array 2070, to bit line 2080. Work station 1500 and controller board 1060 thus initialize assembly 2300 by sending data record 1537, which is essentially a digital programming signal, over VME bus 1010 to program memory 2083, in array 2070, on assembly 2300.

Although the preferred embodiments of the present invention employ multiple programmable assemblies, the inventive method in its broadest sense may be practiced with a single programmable assembly, because, for example, both data record 1527 and 1537 are suitable for sending to assembly 2000. Work station 1500 and controller board 1060 may also initialize assembly 2000 by sending data record 1527 over VME bus 1010 to program memory 2083, in array 2070, on assembly 2000; and may later reinitialize assembly by sending data record 1537 over VME bus 1010 to program memory 2083, in array 2070, on assembly 2000, thereby allowing assembly 2000 to perform different functions at different times. In other words, work station 1500 and board 1060 may generate a programming signal (by sending record 1527 to assembly 2000) for operating assembly 2000 to send a signal from bit line 2078, through array 2070, to interface contact 15010. At a subsequent time, work station 1500 and board 1060 may generate another programming signal (by sending record 1537 to assembly 2000) for operating assembly 2000 to send a signal from interface contact 15010, through array 2070, to bit line 2080.

Figure 16:
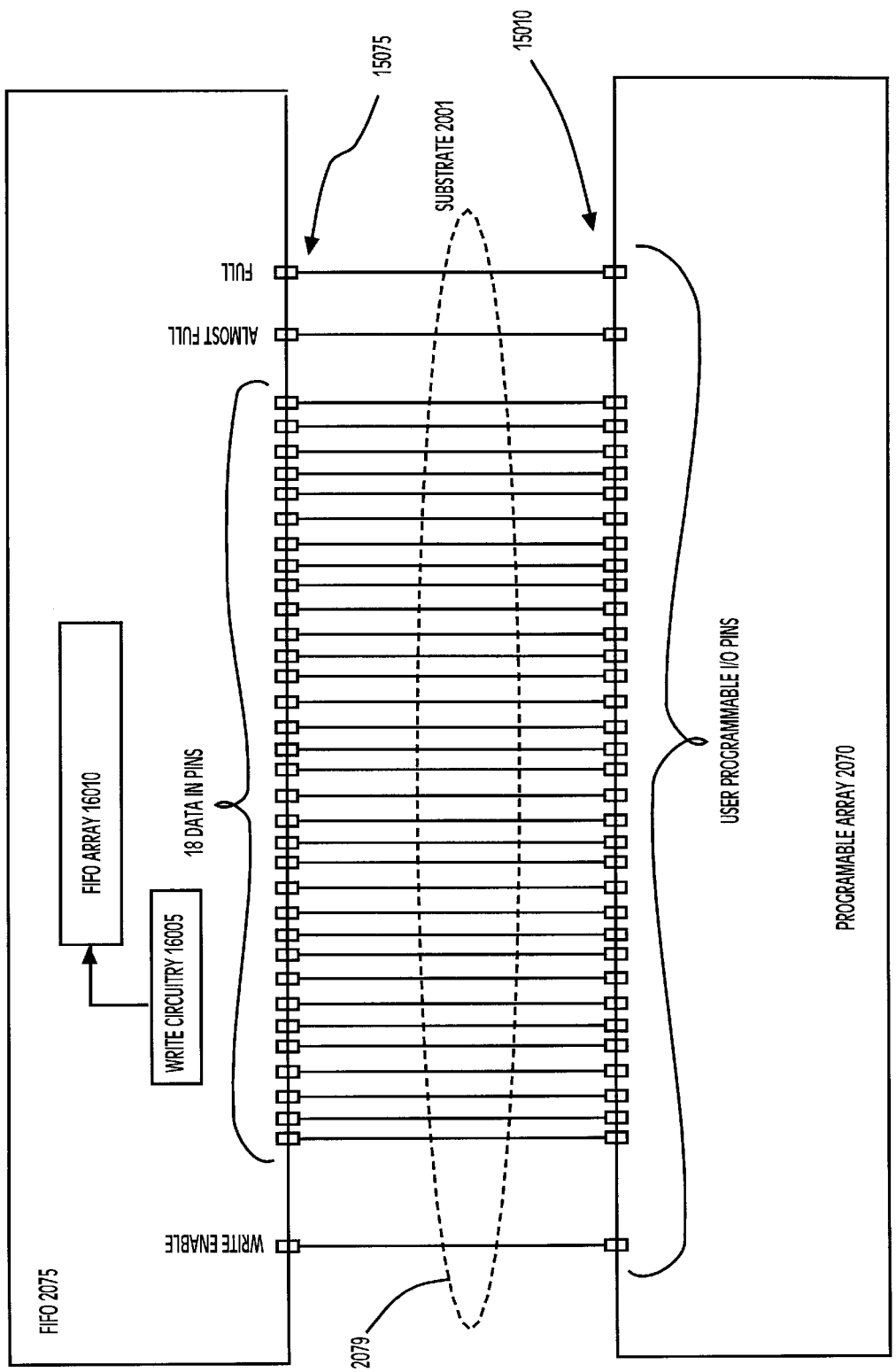
FIG. 16 is a diagram showing inter-package current paths of FIG. 4B in more detail.

FIG. 16 emphasizes part of the interconnection, between FIFO package 2075 and programmable array 2070, already shown and described in connection with FIGS. 4B and 6 above. Bus 2079 is a set of parallel current paths between respective interface contacts 15010 on array 2070 and interface contacts 15075 on FIFO package 2075. FIFO package 2075 contains FIFO memory array 16010 and circuitry 16005 for writing signals on the 18 data in pins into a location in FIFO memory array 16010.

Because each data line of bus 2079 is a contiguous, metallic current path, between the respective interface contact 15010 on array 2070 and the respective interface contact 15075 on FIFO package 2075, each data line is essentially a signal path configured such that a voltage on the corresponding interface contact 15075 is a delayed function of the voltage on the corresponding interface contact 15010.

Figure 17:
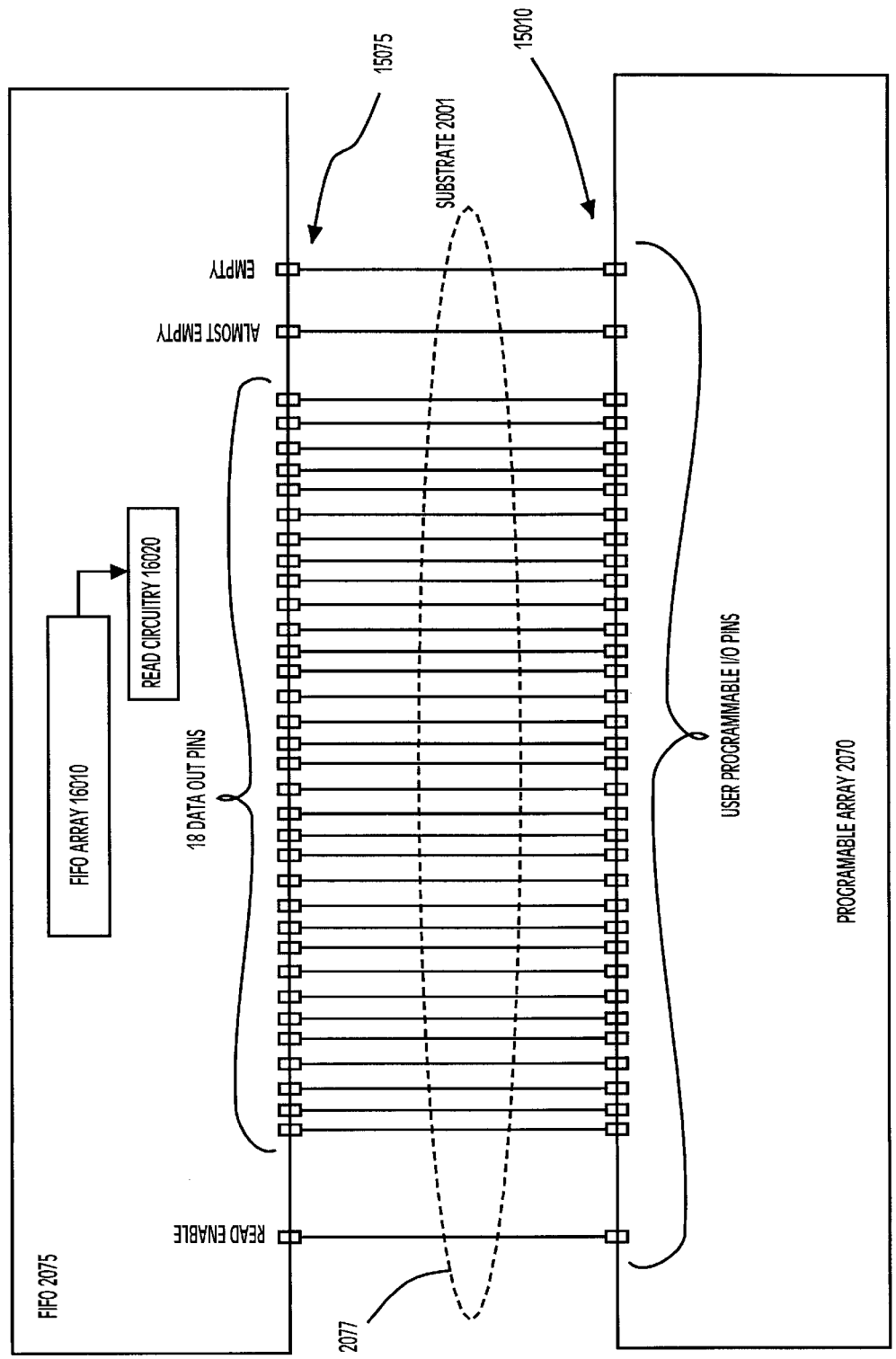
FIG. 17 is another diagram showing inter-package current paths of FIG. 4B in more detail.

FIG. 17 emphasizes another part of the interconnection, between FIFO package 2075 and programmable array 2070, already shown and described in connection with FIGS. 4B and 6 above. Bus 2077 is a set of parallel current paths between respective interface contacts 15075 on FIFO package 2075 and respective interface contacts 15010 on array 2070. FIFO package 2075 contains circuitry 16020 for reading data from a location in FIFO memory array 16010 and sending a corresponding signal on the 18 data out lines.

Because each data line of bus 2077 is a contiguous, metallic current path, between the the respective interface contact 15075 on FIFO package 2075 and respective interface contact 15010 on array 2070, each data line is essentially as the corresponding interface contact 15010 on the corresponding interface contact 15010 is a delayed function of the voltage on the corresponding interface contact 15075.

Figure 18:
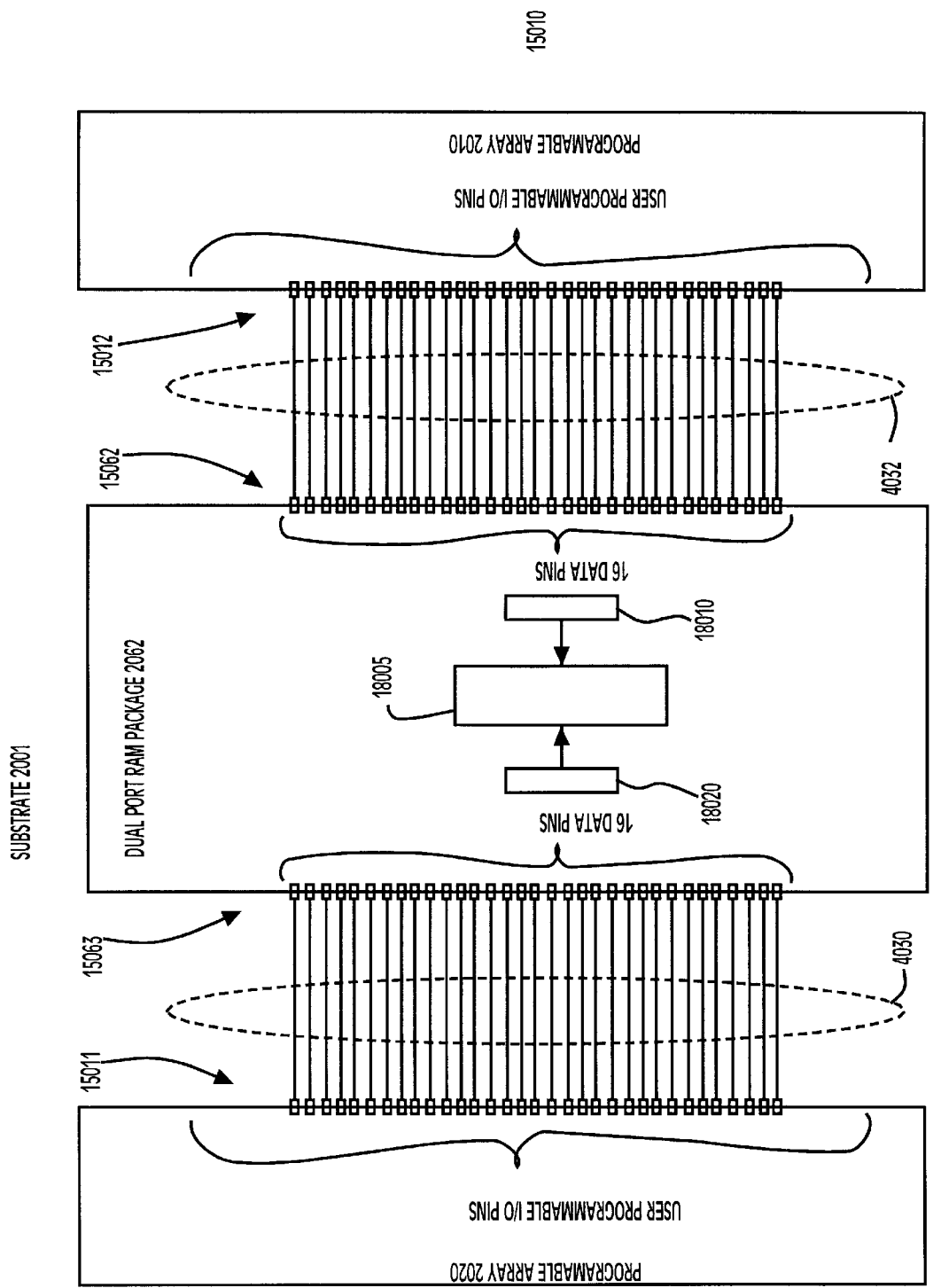
FIG. 18 is another diagram showing inter-package current paths of FIG. 4B in more detail.

FIG. 18 emphasizes an interconnection, between dual port ram (DPR) package 2062 and programmable arrays 2010 and 2020, already shown and described in connection with FIGS. 4B above. Bus 4032 is a set of parallel current paths between respective interface contacts 150012 on array 2010 and interface contacts 15062 on dual port ram package 2062. DPR package 2062 contains circuitry 18010 for writing the signals on the interface contacts 15062 into RAM array 18005. Because each data line of bus 4032 is a contiguous, metallic current path, between the respective interface contact 15012 on array 2010 and the respective interface contact 15062 on DPR package 2062, each line is essentially a signal path configured such that a voltage on the corresponding interface contact 15062 is a delayed function of the voltage on the corresponding interface contact 15012.

DPR package 2062 contains also contains circuitry 18020 for writing the signals on the interface contacts 15063 into RAM array 18005. Because each data line of bus 4030 is a contiguous, metallic current path, between the respective interface contact 15011 on array 2020 and the respective interface contact 15063 on DPR package 2062, each line is essentially a signal path configured such that a voltage on the voltage on the corresponding interface contact 15063 is a delayed function of corresponding interface contact 15011.

Although each of the preferred circuit assemblies conforms to the 9UVME Form Factor standard by eliminating arrays 2010, 2070, and 2050 an assembly may be made that conforms to the 6U VME Form Factor standard.

Thus, each programmable circuit assembly in the preferred embodiments of the present invention includes an array of in-circuit programmable logic packages interconnected with an array of memory packages in a novel manner, allowing for elastic buffering of data in a variety of directions. The programmable assembly thus provides both flexibility and high bandwidth, thereby reducing the cost of high bandwidth processing. For applications such as satellite telemetry, the programmable assembly makes satellite image data less expensive and therefore more available, since a single hardware configuration can be reprogrammed to process respective data formats from various satellites.

The illustrated programmable assembly may be employed in other applications where both flexibility and high bandwidth are desirable, including telemetry simulation, image processing, machine vision, and a variety of other applications where algorithm acceleration is desirable.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method of operating a system having a programmable circuit assembly comprising:
    a substrate,
    a programmable package with a plurality of interface contacts including a first interface contact, a memory, and a plurality of output circuits, each output circuit connected to a respective interface contact, each output circuit configured to generate a logic function defined by a contents of the memory,
    a memory package having a first-in-first-out (FIFO) memory, a first interface contact for writing into the FIFO, and a second interface contact for reading from the FIFO,
    a first signal path connected between the programmable package and the first interface contact on the memory package, and
    a second signal path connected between the programmable package and the second interface contact on the memory package,
    the method comprising the steps of:
        storing a programming signal for operating the assembly to send a first signal from the second signal path, through the programmable package, to the first interface contact of the programmable package; and
        storing another programming signal for operating the assembly to send a second signal from the first interface contact of the programmable package, through the programmable package, to the first signal path.

2. A method of operating a system having a plurality of programmable circuit assemblies, each assembly including
    a substrate,
    a programmable package with a plurality of interface contacts including a first interface contact, a memory, and a plurality of output circuits, each output circuit connected to a respective interface contact, each output circuit configured to generate a logic function defined by a contents of the memory,
    a memory package having a first-in-first-out (FIFO) memory, a first interface contact for writing into the FIFO, and a second interface contact for reading from the FIFO,
    a first signal path connected between the programmable package and the first interface contact on the memory package, and
    a second signal path connected between the programmable package and the second interface contact on the memory package, the plurality of programmable assemblies having a common spatial location of the memory package on the substrate, and a common spatial location of the programmable package on the substrate, the method comprising the steps of:
        operating a first one of the assemblies to send a first signal from the second signal path, through the programmable package, to the first interface contact of the programmable package; and
        operating a second one of the assemblies to send a second signal from the first interface contact of the programmable package, through the programmable package, to the first signal path.

3. The method of claim 2 wherein the system further includes a circuit, located off of the programmable package on the first assembly, and the step of operating the first assembly includes sending a programming signal from the circuit to the programmable package on the first assembly.

4. The method of claim 2 wherein the system further includes a circuit, located off of the first assembly, and the step of operating the first assembly includes
    sending a programming signal from the circuit to the programmable package on the first assembly.

5. The method of claim 2 wherein the system further includes a bus, the first assembly includes circuitry for recognizing a respective bus address for the first assembly, the second assembly includes circuitry for recognizing a respective bus address for the second assembly, circuit, and the step of operating the first assembly includes
    sending a programming signal, over the bus, to the first assembly, and the step of operating the second assembly includes
    sending another programming signal, over the bus, to the second assembly.

6. The method of claim 2 wherein the system further includes a computer having circuitry for recognizing a respective bus address for the computer, and the step of operating the first assembly includes
    sending a programming signal, from the computer, to the first assembly, and the step of operating the second assembly includes
    sending another programming signal, from the computer, to the second assembly.

7. A system comprising:
    a substrate;
    a programmable package with a plurality of interface contacts including a first interface contact, a memory, and a plurality of output circuits, each output circuit connected to a respective interface contact, each output circuit configured to generate a logic function defined by a contents of the memory;

a memory package having a first-in-first-out (FIFO) memory, a first interface contact for writing into the FIFO, and a second interface contact for reading from the FIFO;

a first signal path connected between the programmable package and the first interface contact on the memory package;

a second signal path connected between the programmable package and the second interface contact on the memory package; and a memory including
a first programming signal for operating the assembly to send a first signal from the second signal path, through the programmable package, to the first interface contact of the programmable package, and
a second programming signal for operating the assembly to send a second signal from the first interface contact of the programmable package, through the programmable package, to the first signal path.

8. A system comprising:

a plurality of programmable circuit assemblies, each assembly including
a substrate,
a programmable package with a plurality of interface contacts including a first interface contact, a memory, and a plurality of output circuits, each output circuit connected to a respective interface contact, each output circuit configured to generate a logic function defined by a contents of the memory,
a memory package having a first-in-first-out (FIFO) memory, a first interface contact for writing into the FIFO, and a second interface contact for reading from the FIFO,
a first signal path connected between the programmable package and the first interface contact on the memory package, and
a second signal path connected between the programmable package and the second interface contact on the memory package,
the plurality of programmable assemblies having a common spacial location of the memory package on the substrate, and a common spacial location of the programmable package on the substrate;

means for operating a first one of the assemblies to send a first signal from the second signal path of the first assembly, through the programmable package of the first assembly, to the first interface contact of the programmable package of the first assembly; and means for operating a second one of the assemblies to send a second signal from the first interface contact of the programmable package of the second assembly, through the programmable package of the second assembly, to the first signal path of the second assembly.

9. The system of claim 8 further including
a circuit, located off of the programmable package on the first assembly,
wherein the means for operating the first assembly sends a programming signal from the circuit to the programmable package on the first assembly.

10. The system of claim 8 further including
a circuit, located off of the first assembly;
wherein the means for operating the first assembly sends a programming signal from the circuit to the programmable package on the first assembly.

11. The system of claim 8 further including
a bus,
wherein the first assembly includes circuitry for recognizing a respective bus address for the first assembly, the second assembly includes circuitry for recognizing a respective bus address for the second assembly, circuit, and
wherein the means for operating the first assembly includes
means for sending a programming signal, over the bus, to the first assembly, and the means for operating the second assembly includes
means for sending another programming signal, over the bus, to the second assembly.

12. The system of claim 8 further including
a computer having circuitry for recognizing a respective bus address for the computer, wherein the means for operating the first assembly includes
means for sending a programming signal, from the computer, to the first assembly, and the means for operating the second assembly includes
means for sending another programming signal, from the computer, to the second assembly.

13. A programmable circuit assembly comprising:

a substrate;

a plurality of package groups connected to the substrate, including a first package group and a second package group, each package group including
a programmable package with a plurality of interface contacts, a memory, and a plurality of programmable input/output (I/O) circuits, each I/O circuit connected to a respective interface contact, each I/O circuit configured to generate a logic function defined by a contents of the memory,
a memory package having a first-in-first-out (FIFO) memory, a plurality of first interface contacts for writing into the FIFO, circuitry for sending signals on each of the plurality of first interface contacts into a memory location of the FIFO, a plurality of second interface contacts for reading from the FIFO, and other circuitry for sending signals from a memory location of the FIFO to the plurality of second interface contacts,
a first plurality of signal paths each having a first end connected to a respective interface contact on the programmable package and a second end connected to a respective one of the first interface contacts on the memory package, each first signal path configured such that a voltage on the corresponding first interface contact is a delayed function of the voltage on the corresponding interface contact of the programmable package, and
a second plurality of signal paths each having a first end connected to a respective one of the second interface contacts on the memory package and a second end connected to a respective interface contact on the programmable package, each second signal path configured such that a voltage on the corresponding interface contact of the programmable package is a delayed function of the voltage on the corresponding second interface contact;

a random access memory (RAM) package having a RAM and first and second access ports, each access port having a plurality of interface contacts for writing into the RAM, and circuitry for sending signals on each of the plurality of interface contacts into a memory location of the RAM;

a third plurality of signal paths each having a first end connected to a respective interface contact on the programmable package in the first package group, and a second end connected to a respective one of the plurality of interface contacts of the first access port; and a fourth plurality of signal paths each having a first end connected to a respective interface contact on the programmable package in the second package group, and a second end connected to a respective one of the plurality of interface contacts of the second access port.

14. The assembly of claim 13 wherein each of the first plurality of signal paths is a current path, between the respective interface contact on the programmable package and the respective interface contact on the memory package.

15. The assembly of claim 13 wherein each of the second plurality of signal paths is a current path, between the respective interface contact on the memory package and the respective interface contact on the programmable package.

16. The assembly of claim 13 wherein each of the third plurality of signal paths is a current path, between the respective interface contact on the programmable package in the first package group and the respective interface contact of the first access port.

17. The assembly of claim 16 wherein each of the fourth plurality of signal paths is a current path, between the respective interface contact on the programmable package in the second package group and the respective one of the plurality of interface contacts of the second access port.

18. The circuit assembly of claim 13 further including a second substrate, over the first substrate;

a fifth plurality of current paths each connected to a respective interface contact on the programmable package in the first package group; and a sixth plurality of current paths each connected to a respective interface contact on the programmable package in the second package group.

* * * * *